(12) United States Patent
Abendroth et al.

(10) Patent No.: US 7,219,250 B2
(45) Date of Patent: May 15, 2007

(54) STATUS INDICATION DETECTION AND DEVICE AND METHOD

(75) Inventors: Torsten Abendroth, deceased, late of Peterburg (DE); by Maren Abendroth, legal representative, Peterburg (DE); Hans-Ulrich Fleer, Braunschweig (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 481 days.

(21) Appl. No.: 10/483,511

(22) PCT Filed: Jul. 3, 2002

(86) PCT No.: PCT/EP02/07376

§ 371 (c)(1),
(2), (4) Date: Jul. 9, 2004

(87) PCT Pub. No.: WO03/007096

PCT Pub. Date: Jan. 23, 2003

(65) Prior Publication Data

US 2004/0250151 A1    Dec. 9, 2004

(30) Foreign Application Priority Data

Jul. 9, 2001   (EP) .................................. 01115751

(51) Int. Cl.
*G06F 1/12* (2006.01)

(52) U.S. Cl. ...................... 713/400; 713/503; 327/144; 375/362

(58) Field of Classification Search ................ 713/400; 327/144; 375/362
See application file for complete search history.

(56) References Cited

U.S. PATENT DOCUMENTS

| | | | | |
|---|---|---|---|---|
| 4,851,710 A | * | 7/1989 | Grivna | 327/155 |
| 5,357,613 A | * | 10/1994 | Cantrell et al. | 710/61 |
| 5,602,878 A | * | 2/1997 | Cross | 375/354 |
| 5,638,015 A | * | 6/1997 | Gujral et al. | 327/144 |
| 5,726,595 A | * | 3/1998 | Lin et al. | 327/155 |
| 5,799,175 A | * | 8/1998 | Cassiday et al. | 713/400 |
| 6,493,818 B2 | * | 12/2002 | Robertson | 712/27 |
| 7,058,799 B2 | * | 6/2006 | Johnson | 365/230.06 |

* cited by examiner

*Primary Examiner*—Thuan Du

(57) ABSTRACT

A status indication detection apparatus comprises an input storage stage, an intermediate storage stage and an output storage stage. Status indications are input into the input register of the input stage and are shifted to the intermediate and to the output stage. The input and intermediate storage stages operate with a first reference clock in a first clock domain whilst the output storage stage operates with a different second reference clock in the second clock domain. In accordance with the invention a reading out of the intermediate register of the intermediate stage is only possible during the generation of a hold signal which keeps a current status indication in the intermediate storage stage and blocks a transfer of a new status indication from the input stage.

29 Claims, 9 Drawing Sheets

US 7,219,250 B2

STATUS INDICATION DETECTION AND DEVICE AND METHOD

FIELD OF THE INVENTION

The invention relates to a method and an apparatus for detecting status indications output by a hardware device. Generally, for detecting or latching indication pulses or status indications in a storage device, the status indications are output by the hardware device synchronized to a first reference clock and a processing device or other monitoring equipment may want to read the status indication, for example a bit, synchronized to a second reference clock which has a different phase and/or frequency to said first reference clock. Therefore, status indications may get lost due to the phase and/or frequency mismatch between the two different "clock domains".

The present invention in particular addresses the problem how a stable transfer of indications from the first reference clock domain to the second reference clock domain can be achieved for arbitrary phase relationships between the first and second reference clock.

BACKGROUND OF THE INVENTION

ASICS (Application Specific Integrated Circuits) can be used to manipulate and/or to monitor data streams. Within such ASICS there are typically circuits and functional blocks which generate short pulse-shaped status or error indications. Furthermore, the ASICS must update a latch register as soon as the indication was fetched from the hardware device. As already mentioned above, a register or flip-flop latching the status indication (e.g. a bit) operates in a different clock domain than the circuitry processing the latched indication (e.g. a microcontroller interface). Consequently, a synchronization functionality is needed to avoid metastability when accessing the latch register.

Metastability can occur if the setup-hold window of a flip-flop (FF) is violated. When metastability occurs the logical state of the FF output can not be predicted and furthermore the exact point of time at which the undefined logical value settles to a defined state can only be given to a certain probability of error. Of course, in principle even a metastable flip-flop can be read out. However, it is completely uncertain which logical value is read out due to the metastability.

Furthermore, the synchronization and update functionality must not overlap the detection of an error indication, even if the update request and a new indication coincide in time.

A typical environment where there is need for latching such status indication is for example in the framework of SONET/SDH applications. For such an application a circuitry shall latch short, clock cycle long indications, synchronize them to a microcontroller interface and provide an update at read functionality, while not covering new indications during the read and update phase. For example, a SDH/SONET ASIC shall receive, monitor and process potentially 16 SDH/SONET data steams. In this case, clocks are recovered from the data steams in SDH/SONET applications and therefore the ASIC involves 16 clock domains with the same nominal clock frequency but unpredictable phase relationship amongst each other and to the microcontroller interface which enables a controlling and configuring controller to access the latched indications. The latched indications are supposed to be available until the microcontroller reads them and thereby updates them to the new indication status not covering indications that came in during the read out phase. Therefore, by only two consecutive read accesses the microcontroller is able to detect a change in the indication status.

DESCRIPTION OF THE PRIOR ART

The above problem of updating and latching (detecting) status indications from a hardware device is a general task not limited to the above SONET/SDH application. For example, the German patent application P 198 14 359 (corresponding PCT/EP99/0226 (WO99/50727) and U.S. Ser. No. 09/280,984 now U.S. Pat. No. 6,408,366) by the same applicant describes the problems of storing and accessing status indications as principally shown in FIG. 1.

A hardware device HW outputs status indications SI, for example synchronized to the first reference clock CLK_A, to an input storage means ISM belonging to the clock domain A. The status indications SI' are transferred from the input storage means ISM to the output storage means OSM. For example, the read request RDRQ is output by a processing means PROC in order to read out the status indications SI" from the output storage means OSM. The reading out of the status indications SI" may be synchronized to a second clock CLK_B belonging to the clock domain B whilst the transfer of status indications SI' from the input storage means ISM may be synchronized to a first clock CLK_A belonging to the clock domain A such that generally the readout and the transfer, respectively, do no take place at the same timing (see also the times PD1, PD2 in FIG. 2). This is a result of a phase and/or frequency difference between the clocks CLK_A and CLK_B which are in a practical embodiment not generated from the same source and are generally not distributed over the same clock tree. Even if the clock rate was the same, a general phase difference may be present leading to the problem that the transfer and readout edges of the respective CLK_A and CLK_B pulses do not coincide, i.e. are not synchronized.

In the aforementioned patent applications it is described that the status indication (bits) are collected in the input storage means ISM and are then transferred or copied to several registers in the output storage means OSM such that one or more processing means PROC can access the status indications in the output storage means OSM simultaneously.

FIG. 2 shows a typical phase/frequency relationship between the clock domain A and the clock domain B for the example in FIG. 1. For example, at times PD1, PD2 the raising or falling edges of the clock pulses do not match if the respective clock frequencies are not multiple integers of each other, i.e. the period length Ta is not an integer multiple of the period length Tb. Furthermore, the phase mismatch may vary in time, even if the respective clock frequencies are nominally integer multiples of each other, especially when the clock frequencies are generated from different sources. This for example means that a new status indication SI (indicated with IN_STATUS in FIG. 2) may be clocked into the input storage means ISN synchronized to the first reference clock CLK_A, however, it may not be appropriately transferred and stored in the output storage means OSM when there is a phase and/or frequency mismatch.

The U.S. Pat. No. 5,357,613 discloses a similar circuit as shown in FIG. 1, i.e. an input storage stage consisting of a multiplexer and a D flip flop and an output storage means also consisting of a multiplexer and a D flip-flop. A synchronization stage consisting of two serially connected D flip flops is also provided. Similarly as in FIG. 1, the circuit disclosed in this US-patent operates with two different reference clocks in the input domain and the output domain. Whilst the synchronization stage allows to synchronize the time domain whilst providing a low error rate data capture, firstly it may not work properly for any relationship of frequency and phase of the two clock signals and it cannot guarantee that the value fetched from the output storage stage is the most recent error indication properly transmitted over the clock domain borders.

The U.S. Pat. No. 5,638,015 also discloses a configuration similar to FIG. 1 of the attached drawings. Here, there are provided an input section and an output section each operating with a different reference clock. Here, the idea is to use several delay D flip flops in order to match the two clock domains. It is described that such a configuration avoids metastability. This, however, is only applicable if the clock frequency of the output section is larger or equal than that of the input section. Furthermore, there are only two register stages, one input stage for receiving the incoming pulse and one output stage to which the pulse is transferred directly.

As explained above, conventional technologies cannot be used generically for all phase and frequency relations between indication latching and indication fetching clock domains (hereinafter referred to as clock domain A and clock domain B). The classic synchronization stage approach, as for example described in the aforementioned U.S. Pat. No. 5,357,613 and U.S. Pat. No. 5,638,015, for example does not work if the fetching clock domain B works on a slower clock CLK_B than the latching domain A, which operates on the clock CLK_A. Therefore, conventional techniques may fail to synchronize or do not deliver the stored (latched or detected) indication as fast as possible if clear at read functionality is required at arbitrary phase/frequency relations.

Therefore, conventionally there is not known a status indication detection apparatus and a status indication detection method which incorporates all three functions of latching, synchronization and update at the read time simultaneously without missing incoming status indications.

As described above with reference to the prior art and in particular with respect to the above FIGS. 1, 2, the conventional circuits only consisting of an input storage means and an output storage means ISM, OSM cannot provide an accurate latching, synchronization and update at read function for arbitrary phase and/or frequency relationships of the first reference clock CLK_A (latching domain A) and the second reference clock CLK_B (readout domain B).

SUMMARY OF THE INVENTION

Therefore, the object of the present invention is to provide a status indication detection method and apparatus, which can guarantee for every frequency and phase relationship between the latching reference clock and the readout clock that no status indication gets lost, i.e. that for every frequency and phase relationship a status can be stably transferred to an output register from an input register whilst any new incoming status indication can be read in without being lost.

This object is solved by a method for detecting status indications wherein raw status indications are read into an input storage stage of a first reference clock domain such that the status indications are available in said input storage stage synchronized to a first reference clock of said first reference clock domain; and said read status indications are input into an output storage stage of a second reference clock domain, such that the status indications are available in said output storage stage synchronized to a second reference clock of said second reference clock domain, said second reference clock of said second reference clock domain having a different phase and/or frequency to said first reference clock; wherein said status indications in said input storage stage are shifted to an intermediate storage stage of said first reference clock domain synchronized to said first reference clock; and in response to a read request signal being input into said output storage stage a hold signal is applied to said intermediate storage stage for holding a current status indication in said intermediate storage stage and blocking a shifting of a new status indication from said input to said intermediate storage stage; and during said hold signal a read out signal is applied to said output storage stage for reading the current status indication in said intermediate storage stage into said output storage stage synchronized to said second reference clock.

Furthermore, this object is solved by a status indication detection apparatus for detecting raw status indications, comprising an input storage stage of a first reference clock domain for reading said raw status indications such that the status indications are available in said input storage stage synchronized to a first reference clock of said first reference clock domain; and an output storage stage of a second reference clock domain into which said read status indications are input such that the status indications are available in said output storage stage synchronized to a second reference clock of said second reference clock domain said second reference clock of said second reference clock domain having a different phase and/or frequency to said first reference clock; wherein an intermediate storage stage of said first reference clock domain is provided between the input storage stage and the output storage stage, wherein said status indications in said input storage stage are shifted to an intermediate synchronized to said first reference clock; said output storage stage comprises a control pulse generator for generating a read out signal to be applied to an output register of said output storage stage for reading the current status indication in the intermediate storage stage into said output register synchronized to said second reference clock in response to a read request signal being input into said output storage stage; and said intermediate storage stage comprises a synchronization stage for generating a hold signal to be applied to an intermediate register of said intermediate storage stage for holding a current status indication in said intermediate register and for blocking a shifting of a new indication from said input to said intermediate storage stage.

Thus, in accordance with the present invention the status indication detection apparatus comprises a further stage called the intermediate storage stage belonging to the latching domain. The intermediate storage stage is controlled in such a manner that a current status indication in the intermediate storage stage is locked for the time period of the hold signal such that the output storage stage can apply a readout pulse synchronous to said second reference clock during the hold signal duration. In this case the readout pulse can be still synchronized to the second reference clock whilst the hold signal can be synchronized to the first reference clock. Thus, it does not matter what phase and/or frequency relationship the two reference clocks have.

Furthermore, the format of the read status indications is not necessarily identical to the format of the raw status indications. For example, the raw indications may correspond to occurrences of events while the read indications to a counted number of raw indications.

The present invention also has the advantage that a value fetched by the output storage stage from the intermediate storage stage will always be the most recent status (e.g. error) indication properly transmitted over the clock domain borders.

Preferably, during said hold signal a new raw status indication is read into and kept stored in the input storage stage; and after the hold signal ceases the status indication in the input storage stage is shifted to said intermediate storage stage synchronized to said first reference clock. At the same time, new raw status indications may be input into the input storage stage and at least for the time period of the hold signal they are kept in the input storage stage and will be prevented from being shifted to the intermediate storage stage. Thus, the generation of the readout signal synchronized to the second reference clock during the duration of the hold signal prevents the loss of any status indications despite arbitrary phase and/or frequency relationships of the two reference clocks.

Whilst the read request signal can have any phase with respect to the first or second reference clock, preferably in accordance with one embodiment the read request signal is input into the output storage stage synchronized with said second reference clock. Thus, it can be guaranteed that the generation of the readout signal is also synchronized to said second reference clock.

In accordance with another embodiment, the hold signal is applied to said intermediate storage stage synchronized with said first reference clock.

Furthermore, in accordance with another embodiment of the invention, the status indication from the input storage means is kept in the input storage stage at least for one more first reference clock before the status indication is shifted to the intermediate storage stage.

In accordance with another embodiment of the invention, in response to said read request signal, said control pulse generator generates a read lock pulse synchronized to said second reference clock and supplies it from said second reference clock domain to said first reference clock domain, said read lock pulse having a pulse length being the sum of a time duration needed to allow a safe synchronisation of said read lock pulse in said first reference clock domain with said first reference clock and a time duration to read said status indication from said intermediate storage stage into the output storage stage.

Advantageously said synchronisation stage of said intermediate storage stage synchronizes said read lock pulse to said first reference clock and derives said hold signal with a pulse length of at least the duration of the synchronized read lock pulse from said synchronized read lock pulse.

Advantageously said synchronisation stage derives said hold signal in such a manner that it has a duration of at least one and preferably two periods of said first reference clock and covering at least one clock pulse of the second reference clock.

Advantageously said pulse generator generates said read out signal synchronized to the end of the read lock pulse.

In accordance with another embodiment of the invention, an input update control means of said input storage stage generates a clear pulse for deleting status indications from the input storage stage, said clear pulse being generated after the ceasing of said hold signal. A check whether the contents of said input storage stage and said intermediate storage stage coincide can avoid that the input storage stage is updated with a status indication although the intermediate storage stage has not sampled the old content of the input storage stage as yet. However, alternative solutions to avoid a loss of status indications are possible.

Further preferably the read request signal is synchronized to said second reference clock and has a duration of one second reference clock period. That is, the read request signal only serves as a basis for generating the read lock pulse which can be much longer than one second reference clock period, for example for the case when the second reference clock has a much higher frequency than the first reference clock.

Further preferably the status indications are generated synchronized to the first reference clock. Thus, the status indications can be caught without additional synchronisation problems.

Further preferably said read status indications can comprise one bit in said input, intermediate and output storage stages.

Further preferably said read status indications comprise n bits in said input, intermediate and output storage stages.

Further preferably, for single bit and n bit accumulation, the output register can comprise an output multiplexer and a connected output D flip flop or an n-bit register.

Furthermore, for single bit and n bit accumulation, the control pulse generator can comprise a control means receiving said read request signal and outputting said read lock signal and said readout signal.

Further preferably, for single bit and n bit accumulation, said intermediate register comprises an intermediate multiplexer and an intermediate D flip flop or an n-bit register.

Further preferably, for single bit and n bit accumulation, the synchronization stage comprises at least two serially connected D-flip flops.

Furthermore, for single bit accumulation, the input register can comprise two serially connected multiplexers and an input D flip flop.

Furthermore, for n bit accumulation, the input register can comprise an n-bit register capable of storing n bits simultaneously.

Furthermore, for single bit accumulation, the input update control means can comprise a D flip flop, two AND gates and an XNOR gate.

Furthermore, for n-bit accumulation, the input update control means can comprise a D flip flop, one AND gate and a four input/single output multiplexer.

The hold signal has a primary function to be long enough to cover the occurrence of at least one second clock reference pulse to prevent metastability in the output register and the hold signal is synchronized to the first reference clock to avoid metastability in the intermediate register. Preferably, all operations in the input storage stage and in the intermediate storage stage are carried out synchronized to said first reference clock and all operations in said output storage stage are carried out synchronized to the second reference clock.

The status indications may for example be generated by the surveillance of a plurality, e.g. 16, SDH/SONET data bit streams.

A further embodiment covers the realization of the input, intermediate and output stage by VSLI structures.

Furthermore, it should be noted that the invention also covers various modifications and variations, for example combinations of features and/or steps which have been described separately in the description and/or the claims.

Hereinafter, the invention will be described with reference to its embodiments and as illustrated in the attached drawings.

BRIEF DESCRIPTION OF THE DRAWINGS

In the drawings the same or similar reference numerals denote the same or similar steps throughout. In the drawings.

Figure 3:
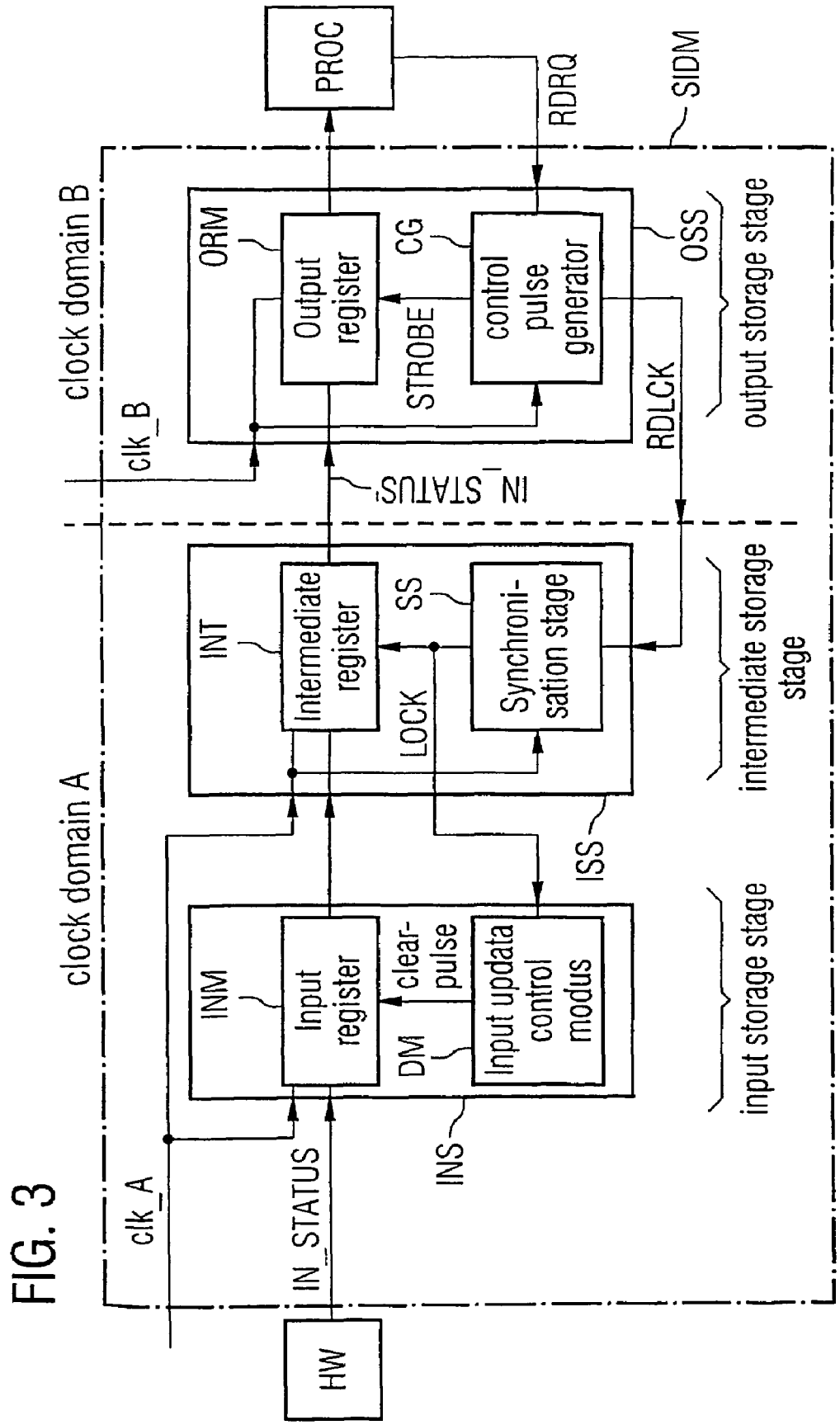
FIG. 3 shows an embodiment of the status indication detection SIDM apparatus in accordance with the invention.
Figure 4:
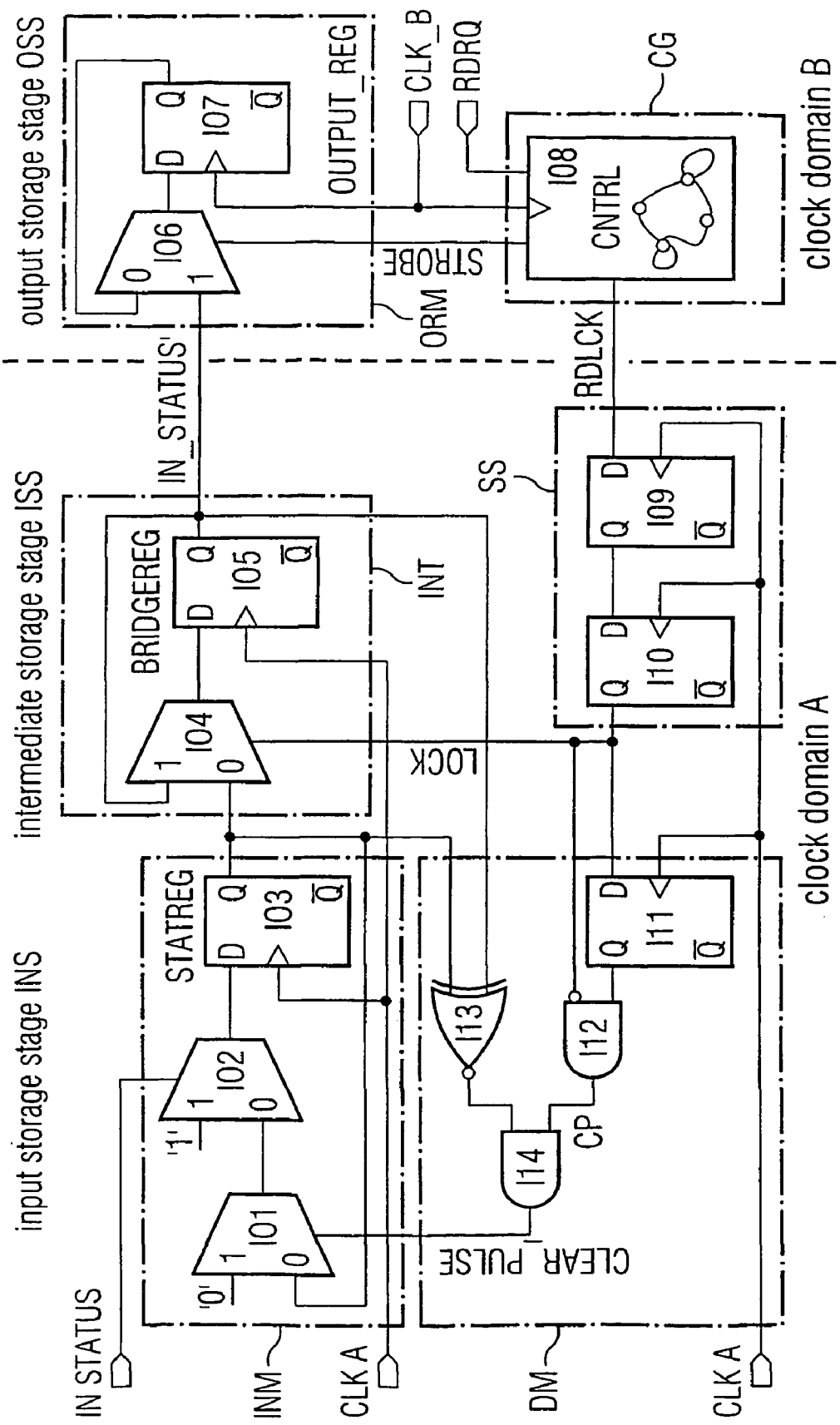
FIG. 4 shows a more detailed embodiment of the elements shown in FIG. 3, for the case of single bit read indications.
Figure 5A:
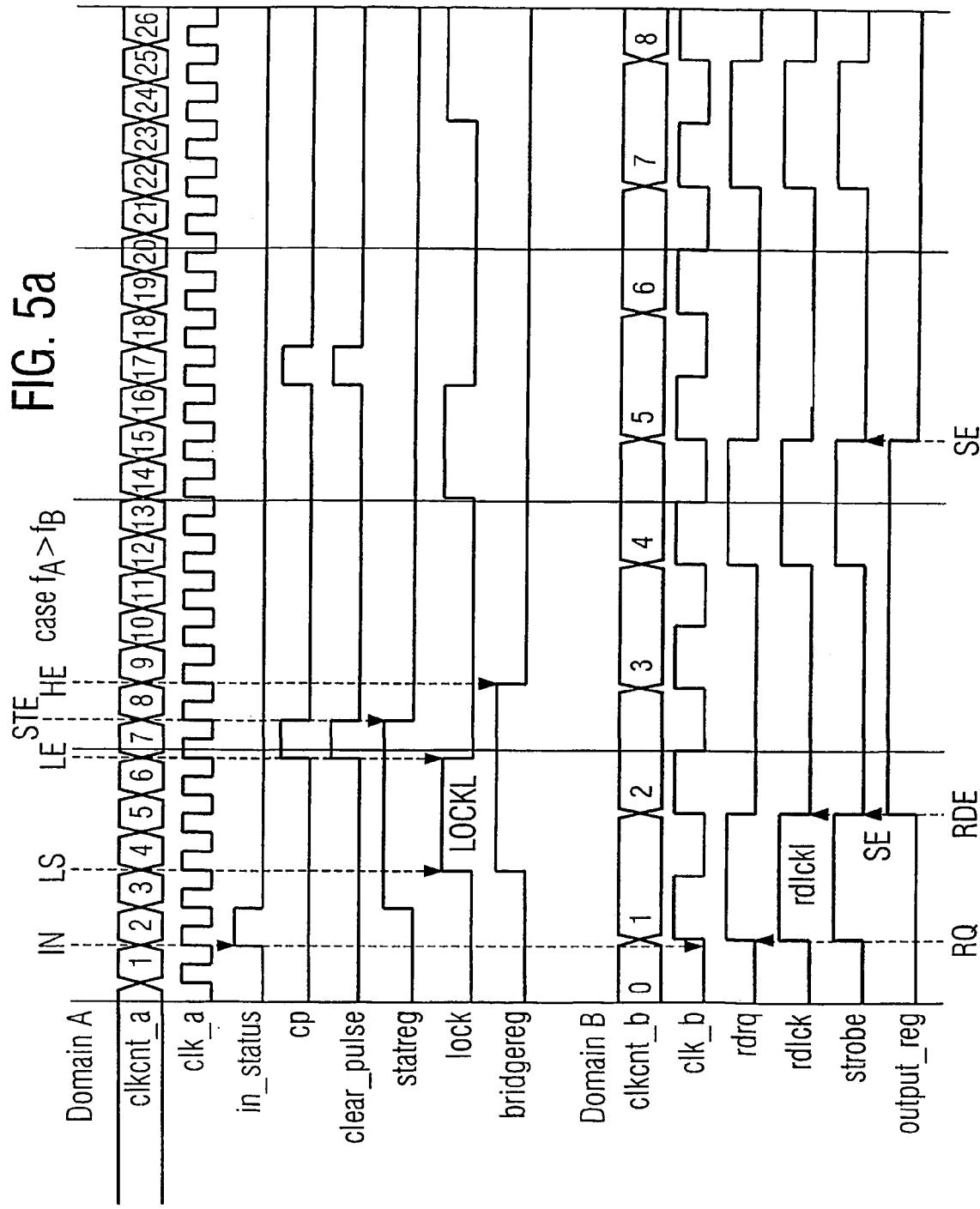
FIG. 5a shows the relationships of signals shown in FIG. 3 and FIG. 4 for the case when the first reference clock CLK_A has a higher frequency than the second reference clock CLK_B.
Figure 5B:
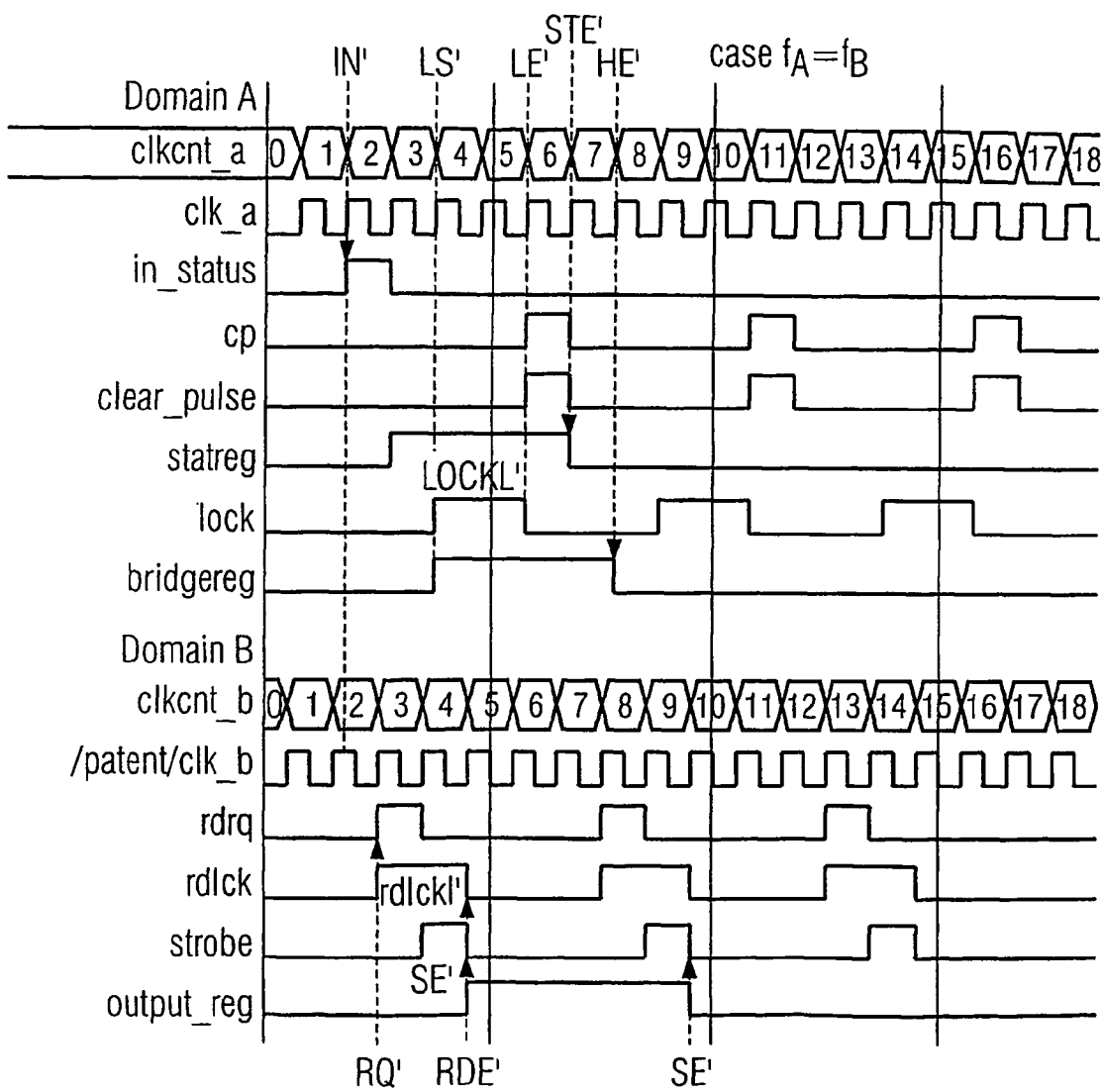
FIG. 5b shows the case where the first and second reference clocks CLK_A, CLK_B have the same frequency $f_A = f_B$.
Figure 5C:
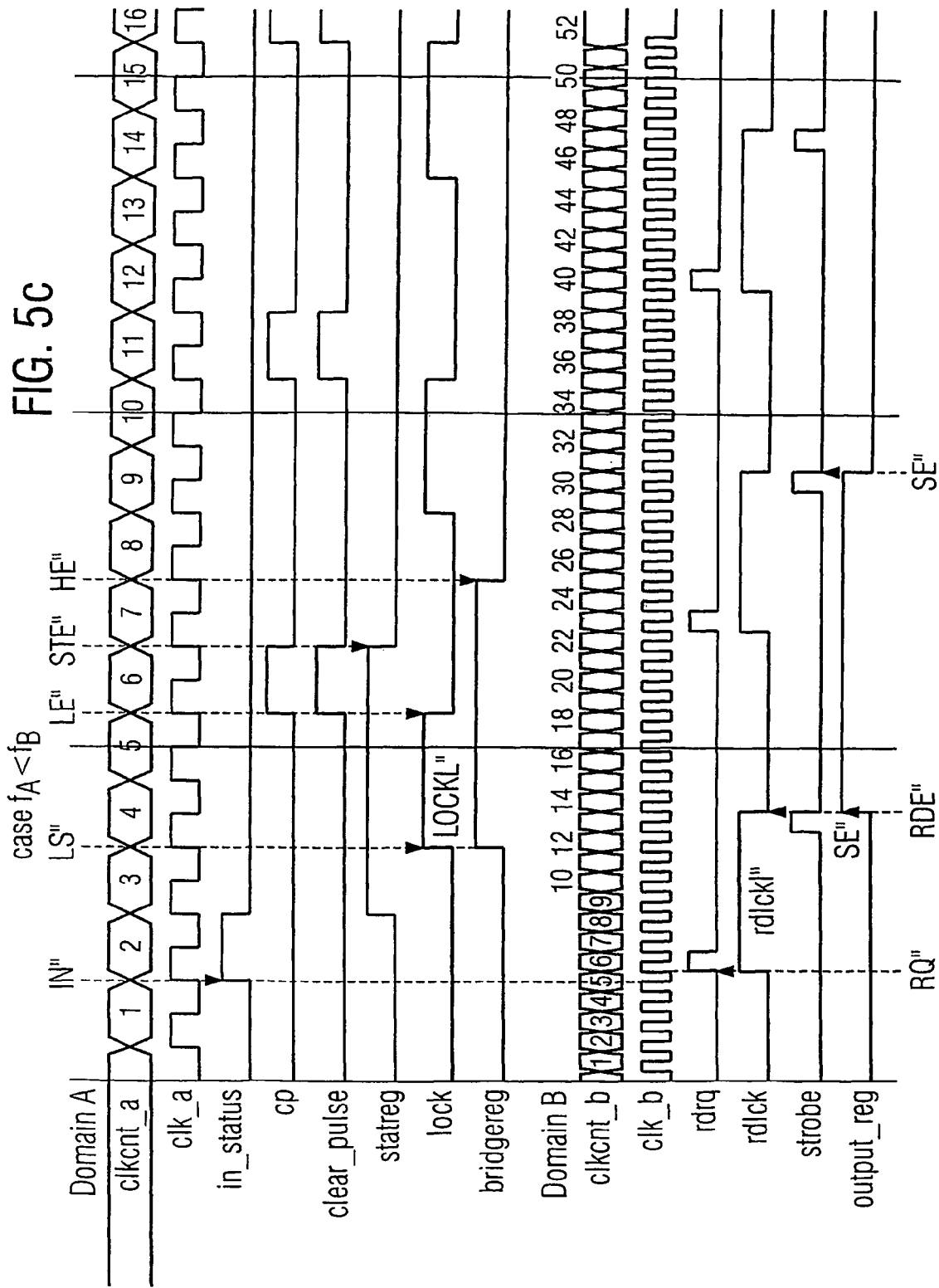
FIG. 5c shows the relationship of signals shown in FIG. 3 and FIG. 4 for the case where the first reference clock CLK_A has a lower frequency $f_A$ than the frequency $f_B$ of the second reference clock CLK_B.
Figure 6:
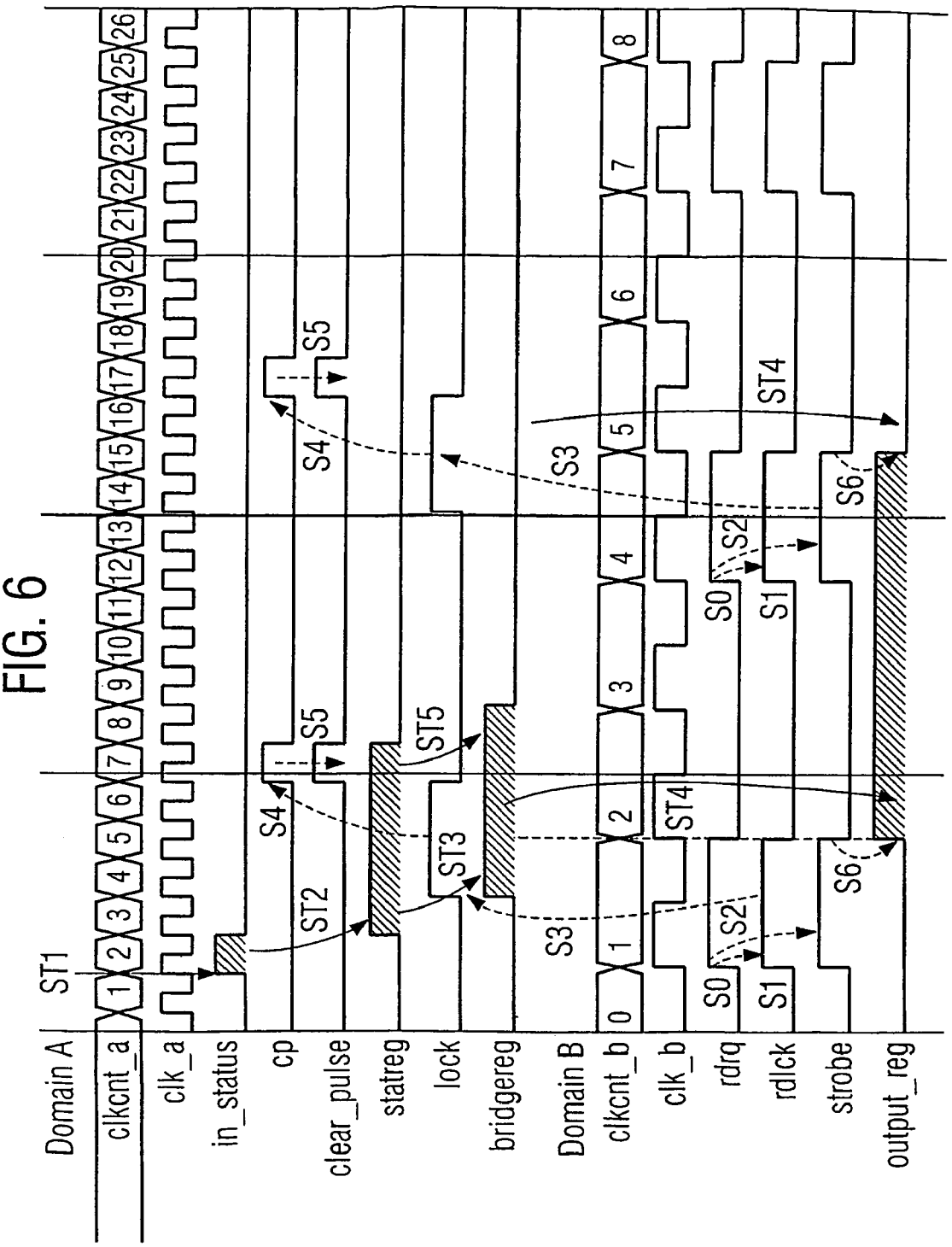
FIG. 6 shows a sequential flow chart of generating signals and transferring status indications for the circuits in FIG. 3 and FIG. 4.
Figure 7:
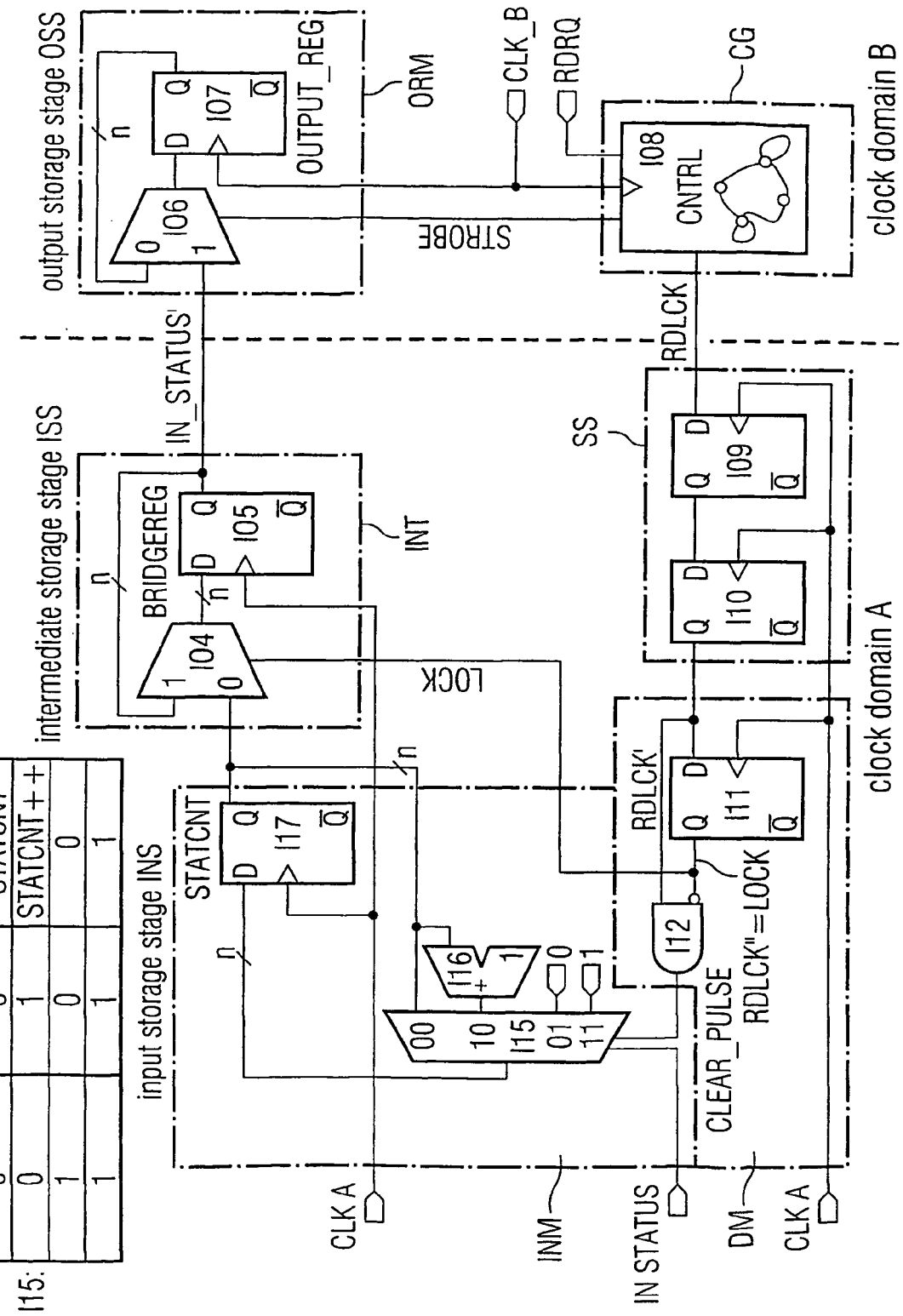
FIG. 7 shows a more detailed embodiment of the elements shown in FIG. 3, for the case of counted raw indications.

It may in particular be noted that in FIG. 6 and FIG. 7 as well as in FIGS. 5a, 5b, 5c and FIG. 8 the designations "STATREG, BRIDGEREG and OUTPUT_REG" designate the input register INM, the intermediate register INT and the output register ORM shown in FIG. 3 and the respective circuits in the special embodiment in FIG. 4 and FIG. 7.

DETAILED DESCRIPTION OF THE DRAWINGS

Single Bit or N Bit Status Indication

Hereinafter, the principle of the invention will be described with reference to FIG. 3, FIG. 5a (case $f_A > f_B$) and the sequential flowchart of signal generations and status indication shifting in FIG. 6. That is, the principle of the invention will first be described for the case where the first reference clock CLK_A has a much higher frequency $f_A$ than the frequency $f_B$ of the second reference clock CLK_B. However, similar considerations hold for the case $f_A = f_B$ and $f_A < f_B$. Furthermore, the principle of the invention will be described independently of the fact whether the status indication is a single bit or a n-bit status indication.

Figure 1:
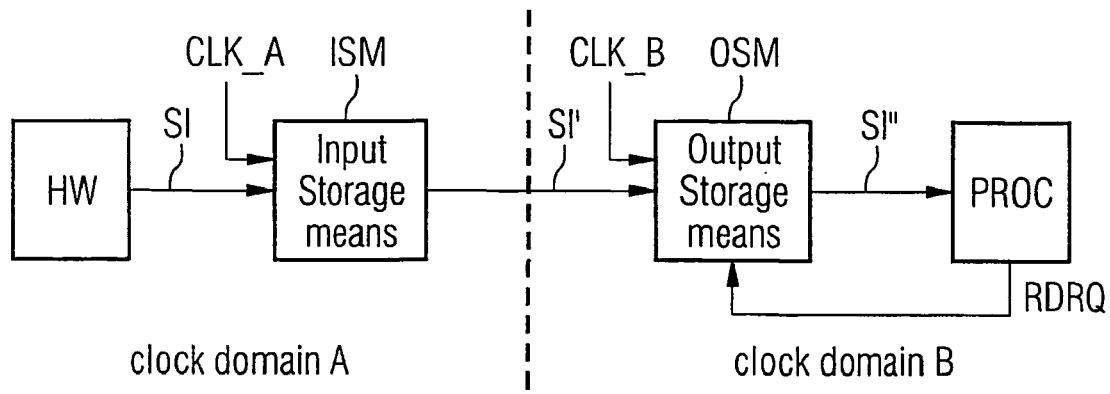
FIG. 1 shows a status indication detection apparatus in accordance with the prior art, comprising an input storage stage ISM and an output storage stage OSM.
Figure 2:
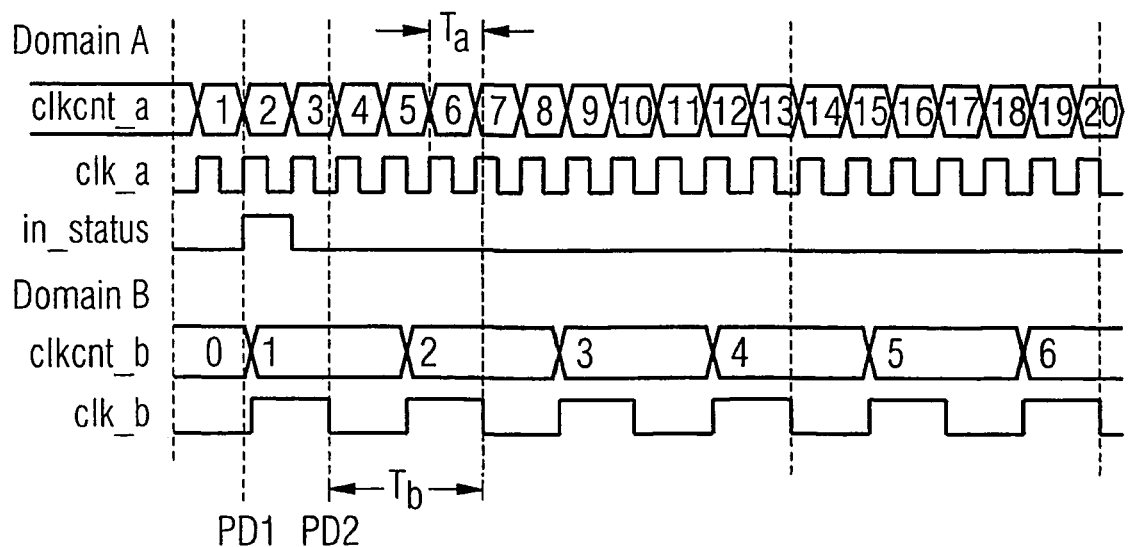
FIG. 2 shows an example of a phase and/or frequency relationship of a first reference clock CLK_A and the second reference clock CLK_B for the case where the first reference clock CLK_A has a much higher frequency than the second reference clock CLK_B.

As shown in FIG. 3, the status indication detection apparatus SIDM in accordance with the invention is similar to the apparatus in FIG. 1 in as far as it comprises an input storage stage INS into which status indications IN_STATUS are read synchronized to first reference clock CLK_A and an output storage stage OSS into which status indications IN_STATUS' are input synchronized to a second reference clock CLK_B. The first and second reference clock CLK_A, CLK_B generally have a different phase and/or frequencies $f_A$; $f_B$ as already illustrated in FIG. 2.

As one of the differences to the apparatus in FIG. 1, the inventive apparatus in FIG. 3 comprises between the input storage stage INF and the output storage stage OSS a further intermediate storage stage ISS. Status indications in said input storage stage INS are shifted to said intermediate storage stage ISS synchronized to said first reference clock CLK_A, as is indicated with the inputting of the first reference clock CLK_A into the input and intermediate storage stages INS, ISS.

Therefore, also in FIG. 3 a first domain A where all operations and signalling are carried out synchronized to the first reference clock CLK_A and a second domain B where all operations and signalling are carried out synchronized to the second reference clock CLK_B can be distinguished, similarly as in FIG. 1, but of course with the difference of the additional intermediate storage stage ISS. The read request signal RDRQ is input to the second clock domain B from outside and may therefore have an arbitrary phase relationship to the pulses of the second or first reference clock CLK_B or CLK_A. However, preferably also the read request signal RDRQ is synchronized to the second reference clock CLK_B.

As shown in FIG. 3, the status indications IN_STATUS (i.e. error bit indications) may be output for example by a hardware device (HW), for example from a SONET/SDH application. However, the status indications can generally come from other sources and it is in the context of this invention for example irrelevant whether they are generated by hardware or software. Generally, the status indications have a bit-structure and depending on the logic used they will indicate a certain status depending on their level "0" or "1".

As shown in FIG. 6, the status indications may occur synchronized to the first reference clock CLK_A. However, the status indication IN_STATUS need not necessarily be synchronized to the first reference clock CLK_A and need not necessarily be one period of the first reference clock CLK_A long.

For example, IN_STATUS may be synchronized to the first reference clock CLK_A but may be longer than this first reference clock CLK_A period. In this case a negative edge detection could be performed (for example similarly as with the gates I10, I11, I12 in FIG. 4 which is hereinafter explained with more details below) to input this status indication synchronized into the input storage stage.

As a further example, the status indication IN_STATUS may be asynchronous to the first reference clock CLK_A. In this case, a conventional synchronisation stage (comprising at least two serially connected flip-flops like I09, I10 in FIG. 4 to be explained with more details below) could be introduced with the limitation that the status indication frequency $F_{CLK\_IN}$ is smaller than the first reference clock frequency CLK_A. The result would be the same as in the previous example, namely that the status indication IN_STATUS is read into the input storage stage in such a manner that it is available in the input storage stage synchronized to said first reference clock CLK_A, as shown in FIGS. 5a, 5b, 5c and in FIG. 6.

The status indications IN_STATUS are latched in the input storage means INS, are then transferred to the intermediate storage stage ISS and are then transferred to the output storage stage OSS when a read request signal RDRQ is input into the output storage stage OSS. For example, a processing device interested in the status indications may output such a read request signal RDRQ to the output storage stage OSS at any arbitrary timing although as explained above also an inputting only synchronized to the second reference clock CLK_B is possible.

As shown in FIG. 6 and also in FIG. 5a, in accordance with the present invention, an input register INM of the input storage stage INS, an intermediate register INT of the intermediate storage ISS and an output register ORM of an output storage stage OSS are controlled with special control signals CLEAR_PULSE, LOCK and STROBE such that the first and second reference clocks CLK_A, CLK_B can have an arbitrary frequency and/or a phase relationship and still no status indication will be lost; i.e. every status indication IN_STATUS input to the input storage stage INS will be safely transferred into the output register ORM in response to the issuance of the read request signal RDRQ.

Thus, it can be said that for the status indication detection apparatus SIDM shown in FIG. 3, a synchronization between the two clock domains A, B is provided on a functional basis and not by synchronization stages and is inseparately merged with a "clear at read" feature (as seen in FIG. 6) to build up a generic design applicable for arbitrary clock relationships between the first and second reference clock CLK_A, CLK_B.

STROBE Readout Signal Generation

Since the time relationships and functions of the signals CLEAR_PULSE LOCK and STROBE is relevant for the understanding of the invention, hereinafter, with reference to FIG. 6 (also showing other signals of the embodiment in FIG. 4) first the relationship of the signals LOCK and STROBE is explained.

As shown in FIG. 6, in step S0 a read request signal RDRQ is input into the output storage stage OSS, for example from a processing means PROC which generally may be even outside the second clock domain B in yet another clock domain C (not shown in the figure), i.e. it is not necessarily synchronized to the second reference clock CLK_B. That is, the read request signal RDRQ may be misaligned to the pulses of the second reference clock CLK_B since in the general case it only provides an indication to the output storage stage OSS that a transfer of a status indication IN_STATUS' into said output storage stage OSS is desired. However, it may be arranged that the read request signal RDRQ is indeed synchronized to the second reference clock CLK_B, as can be seen in FIG. 6.

As indicated with the arrow RQ in FIG. 5a (and with the arrows RQ', RQ" in FIGS. 5b, 5c) the read request signal RDRQ may be synchronized to the second reference clock CLK_B but it is for example misaligned to the first reference clock CLK_A of the first clock domain A, as indicated with the arrow IN. Furthermore, as shown in FIG. 5a with the end arrow RDE (and with the end arrows RDE', RDE" in FIGS. 5b, 5c) the read request signal RDRQ may preferably have the duration of one second reference clock period.

In response to receiving the read request signal RDRQ with the above-described configuration, a control pulse generator CG of the output storage stage OSS generates the read lock pulse RDLCK and the readout signal STROBE respectively applied to the input storage stage ISS and an output register ORM of the output storage stage OSS, as indicated with steps S1, S2 in FIG. 6.

As seen in FIGS. 5a, 5b, 5c for the different frequency and phase relationships between the two reference clocks CLK_A, CLK_B, the read lock pulse RDLCK has a pulse length RDLCKL, RDLCKL' and RDLCKL" of at least one period length of the second reference clock CLK_B synchronized RDE, RDE', RDE" to the read request signal RDRQ. However, as seen in FIG. 3, the read lock pulse RDLCK is to be transferred from the clock domain B to the clock domain A. To ensure that the clock domain A can safely capture and synchronize this read lock pulse aligned to the first reference clock CLK_A in the clock domain A, the pulse RDLCK should preferably have a pulse length RDLCKL, RDLCKL' and RDLCKL" of at least one period length Tclk_A of the first clock reference CLK_A. Even more preferably it should have a length of one period length Tclk_A of the first clock reference CLK_A plus the duration of the setup-hold window of a sampling flip-flop (register) in the first domain A which receives the read lock signal RDLCK, i.e.

$$RDLCKL, RDLKCL', RDLCKL'' \geq Tclk\_A + T\text{setup\_hold} \quad (1)$$

because this allows the capturing of the read clock pulse for arbitrary phase relationships between the clock domains. Thus, the read lock signal RDLCK (read lock) is derived from the read request pulse RDRQ synchronously to the second reference clock CLB_B. Basically, it is the pulse RDRQ widened synchronously to the second reference clock CLK_B.

The readout signal STROBE has preferably a pulse length equal to one period of the second reference clock CLK_B; in particular the readout signal STROBE with the single pulse period length is synchronized to the end of the read lock pulse RDLCK. Due to the different frequency relationships FIGS. 5b and 5c clearly indicate the single pulse length of the STROBE signal whilst in FIG. 5a the STROBE signal has the same length as the RDLCK pulse. However, this is generally only true for the case $f_A > f_B$ whilst in the general case in FIG. 5b and FIG. 5c it can be seen that the STROBE signal has generally a single pulse period synchronized to the end of the RDLCK pulse.

As indicated in FIG. 6, completely uncorrelated to the occurrence of the read request signal RDRQ a new status indication occurs synchronized to a pulse of the first reference clock CLK_A (as indicated with the arrow IN, IN' and IN" in FIGS. 5a, 5b, 5c) in step ST1 and with successive occurrences of pulses of the first reference clock CLK_A the input register INS of the input storage stage INS remains set with a value corresponding to the status indication in step ST2 (as will be understood later from the description of FIG. 4, the status indication IN_STATUS is not really "clocked" into the register STATREG of the input register INM because there is no direct connection between the status indication line IN_STATUS and the D-input of the register STATREG; a logical 1 on IN_STATUS merely causes a setting of the register STATREG via the gates IO2, IO1 until it is read out).

Since neither the exact temporal occurrence of the read request pulse RDRQ nor the exact temporal occurrence of a new status indication IN_STATUS can be known beforehand and since furthermore the first and second reference clock CLK_A and the second reference clock CLK_B have arbitrary frequency and/or phase relationships, no definite and fixed relationship between the occurrence of RDRQ, RDLCK and STROBE with respect to IN_STATUS can be established. All that can be said is that in response to the read request signal RDRQ a number of second clock reference CLK_B periods (in FIG. 5a: one clock period; in FIG. 5b: two clock periods; in FIG. 5c: eight clock periods; determined by the length of RDLCK) "later" a readout strobe signal STROBE occurs (however, it may be noted that no matter when the readout pulse STROBE occurs, it may occur synchronized to a pulse of the second reference clock CLK_B).

With respect to the expression "later", this means that the readout pulse STROBE must be generated during but at the end of the read lock pulse RDLCK. As explained above, the read lock pulse RDLCK must be so long that it can be safely synchronized in the clock domain A and that it can cause a holding (via the hold signal LOCK) of the data in the intermediate storage stage ISS until the data has been shifted to the output register ORM. That is, if one was to place the readout signal STROBE completely arbitrarily within the duration of the read lock pulse RDLCK, then a situation could occur where it is for example placed at the beginning of the read lock signal RDLCK, i.e. at a point of time in which the read lock pulse RDLCK has not as yet been synchronized in the clock domain A and thus the hold signal LOCK has not been generated as yet. However, if the hold signal LOCK is not generated, the freely changing data in the intermediate register could cause a metastability in the output register which is in particular serious when for the frequency relationship $f_A \gg f_B$. Therefore, the readout pulse STROBE should preferably be generated for one second clock period at the end of the readout pulse STROBE.

Furthermore, although FIGS. 5a, 5b, 5c and FIG. 6 shows the read out signal STROBE to be synchronized to the second reference clock CLK_B, the read out pulse STROBE needs not necessarily be generated synchronized to the second reference clock CLK_B. Important is merely that neither changes of the read out signal STROBE itself nor changes in the intermediate register of the intermediate storage stage violate the setup-hold window of the output register of the output register stage. For example, it can be imagined that an outside clock C is used by the processing means PROC for generating the read request signal RDRQ and, for a relationship of $T_{CLK\_B} < T_{CLK\_C}$ with a known maximum phase jitter, that the read out signal STROBE is composed of a plurality of pulses each having the period of CLK_B and that these pulses are placed under a positive edge of the output register (positive-edge triggered) in such a manner that the setup-hold window of the output register remains free of signal changes. Therefore, the read out signal STROBE may not necessarily be generated synchronized to said second reference clock CLK_B pulses.

Locking the Content of the Intermediate Resister INT

As can be understood from FIG. 3 and from step S3 in FIG. 6, of course the read lock signal RDLCK is responsible that a synchronization stage SS in the intermediate storage stage ISS can generate the hold signal LOCK to be applied to the intermediate register INT of the intermediate storage stage for holding a current status indication in said intermediate register INT and for blocking a shifting of a new indication from said input to said intermediate storage stage INS; ISS.

However, other mechanisms for generating the hold signal LOCK could be used. Important is that the hold signal LOCK has a duration LOCKL; LOCKL'; LOCKL" (shown in FIGS. 5a, 5b, 5c) such that at least one clock pulse of the second reference clock CLK_B occurs therein. This is generally true for all cases in FIGS. 5a, 5b and 5c. Due to the different frequency relationships, in FIG. 5a the hold signal LOCK covers only one occurrence of second reference clock pulse, in FIG. 5b the duration of the hold signal LOCK covers two occurrences of a pulse and in FIG. 5c a hold signal LOCK covers a plurality of second reference clock pulses.

The timing of generation the hold signal LOCK and the duration of the hold signal LOCK can be easily understood by looking at the time relationships of the read lock pulse RDLCK, the hold signal LOCK itself and the readout signal pulse STROBE. It is best to first look at the generation of RDLCK. RDLCK is mainly responsible for generating the hold signal LOCK, used for freezing the status indication transferred to the intermediate register INT. The duration of the read lock signal RDLCK mainly determines the duration of the hold signal LOCK. Essentially, the hold signal LOCK must be long enough that the data from the intermediate register INT can be moved to the output register ORM with the read pulse STROBE. Furthermore, the read lock signal must be long enough to allow a clocking or sampling of it into the clock domain A since otherwise the hold signal LOCK cannot be generated at all. More specifically, the duration of the read lock pulse RDLCK is the sum of the time for the safe synchronization of RDLCK into the first clock domain A plus the transfer time for data from the intermediate register INT to the output register ORM. Thus, the duration of the hold signal LOCK solely depends from the length of the read lock signal RDLCK and is not automatically 2 clock periods of the first reference clock CLK_A long (although in FIGS. 5a, 5b, 5c it happens to be of this duration to fulfil the above equation (1) with 2Tclk_A). However, a typical duration for the hold signal LOCK to fulfil equation (1) is 2Tclk_A.

It can be seen from FIG. 5a that preferably the synchronization stage SS generates the hold signal LOCK synchronized to the first reference clock CLK_A because the synchronization stage SS receives the first reference signal CLK_A. Despite the fact that the length RDLCKL (RDLCKL', RDLCKL") will in principle determine the duration LOCKL of the hold signal LOCK, the lengths LOCKL and RDLCKL will not be completely identical because basically the length RDLCKL is "mapped" or "synchronized" to the first reference clock CLK_A by the synchronisation stage.

As with the readout signal STROBE, also no clear temporal relationship between the occurrence and the shifting of a status indication ST1, ST2 and the actual occurrence of the hold signal LOCK can be made, at least for the reason that LOCK is for example based on RDLCK and thus on the occurrence of the RDRQ pulse.

However, what is important is that after the occurrence of the read request pulse RDRQ a hold signal LOCK, which has a length covering at least one clock pulse of the second reference clock, is generated, preferably synchronized to the first reference clock CLK_A and, since it is at least of the duration of the read lock pulse RDLCK transferred to the first clock domain A, with a duration which allows the capturing of RDLCK in the clock domain A plus the necessary setup-hold time in accordance with the above equation (1). Furthermore, it is important that during the duration of the hold signal LOCK the current status indication in the intermediate register INT is kept (for example by a clock cycling procedure as will be explained with the specific embodiment in FIG. 4) and that during the duration of the hold signal LOCK a shifting of a new indication from the input register INM to the intermediate register INT is blocked.

Temporal Relationship of STROBE and LOCK Pulse

Whilst no exact definition of temporal relationships between the reading in of new status indications (in steps ST1, ST2) into the input register INM and the occurrence of the read request pulse RDRQ, the readout pulse STROBE and the hold pulse LOCK can be made, i.e. a hold signal LOCK covering at least one period of the second reference clock occurs some time after a read request pulse RDRQ, an important quasi-temporal relationship exists between the strobe pulse STROBE and the hold pulse LOCK.

That is, in response to the receipt of the read request signal RDRQ a readout pulse STROBE having a duration of one second clock pulse CLK_B period is placed at the end of the read request signal RDRQ synchronized to the second reference clock CLK_B (to avoid that the readout pulse STROBE is generated before the read lock pulse RDLCK being based on the read request signal RDRQ has been synchronized in the clock domain A). On the other hand, the read lock signal RDLCK has a duration necessary for the synchronization in the clock domain A plus a duration necessary for the setup-hold (in accordance with equation (1)) and at least of a duration allowing a shifting of data from the intermediate register to the output register. Finally, the hold signal LOCK has a duration at least of the same duration as the read lock signal RDLCK, i.e. long enough to allow the transfer of the data from the intermediate register to the output register.

That is, as seen in all FIGS. 5a, 5b, 5c for the different relationships of frequencies, the readout pulse STROBE may occur exactly during the hold signal LOCK duration LOCKL, LOCKL', LOCKL". As explained above, through the intermediary of the read lock pulse RDLCK (or by some other means) the strobe pulse STROBE always occurs synchronized to the second reference clock CLK_B and when this strobe pulse STROBE occurs during the duration LOCKL, LOCKL', LOCKL", then it is possible to readout, synchronized with the second reference clock CLK_B, whatever current status indication is held in the intermediate register INT. If a status indication has been transferred in earlier first reference clock periods in steps ST1, ST2, ST3 (as shown in FIG. 6), then the readout signal STROBE will readout this status indication during the duration of the hold signal LOCK because from the lock start position LS, LS', LS" of the hold signal LOCK, any current status indication in the intermediate register INT will be kept (through a cycling process) and the shifting of a new status indication into the intermediate register INT is blocked.

On the other hand, after the end of the hold signal LOCK (as shown with the arrow LE, LE' and LE" in FIGS. 5a, 5b, 5c) any status indication present in the input register INM is shifted to the intermediate register INT synchronized to said first reference clock CLK_A, as indicated with step ST5 in FIG. 6.

Next, the interaction of the control exercised by the hold signal LOCK on the intermediate register INT and the control executed by an input storage control means DM with the clear pulse CLEAR_PULSE on the input register INM is explained.

As can be seen from FIG. 3 and FIG. 4, the hold signal LOCK has no direct influence on the input register INM. A detection of a negative edge of the hold signal LOCK (via the gates I12) leads to the generation of a primary clear pulse CP. However, if this primary clear pulse CP was directly applied to the input register INM, CP would cause the input register INM, more specifically the register STATREG shown in FIG. 4, to assume a current value pending at the input IN_STATUS immediately after the negative edge in the hold signal LOCK, even if the intermediate register INT (the BRIDGEREG) has not as yet taken over the last stored value in the input register (the STATREG). This must be avoided since otherwise a status indication in the input register might get lost. Consequently, the gates I13, I14 generate, on the basis of the primary clear pulse CP, of the current output of input register (the Q output of the STATREG) and of the current output of intermediate register (the Q output of the BRIDGEREG) the clear pulse CLEAR_PULSE, allowing a change of the content of STATREG with a new status indication IN_STATUS, only at a timing after the contents of STATREG and BRIDGREG are the same (STATREG=BRIGDEREG), i.e. after the previous status indication in the STATREG has been successfully transferred to the intermediate register INT.

Thus, one can say that the clear pulse CLEAR_PULSE for allowing the take-in of a new status indication is only generated after the expiration of the hold signal LOCK and when the stored contents of the input register INM and the intermediate register INT coincide. This is the purpose of steps S4, S5 carried out by the input storage control means DM and explained hereinafter with more detail regarding the special embodiment in FIG. 4.

As explained above, the duration or pulse length LOCKL, LOCKL', LOCKL" of the hold signal LOCK (in FIG. 5a: three first reference clock periods; in FIG. 5b: two first reference clock periods; in FIG. 5c: two first clock reference periods; i.e. at least two periods of said first reference clock) and the actual temporal occurrence of this hold signal LOCK is uncritical, as long as its duration is long enough to allow the placement of a strobe pulse STROBE synchronized to the second reference clock within the hold signal pulse LOCKL. Since during the hold signal LOCK duration new status indications can be read into the input register INM and are kept (cycling) in the input register INM and since a transfer of new indications into the intermediate register INT is blocked whilst the current status indication is kept (cycling) in the intermediate register ISS, there is on the one hand no danger that a new status indication gets lost (it will be kept cycling in the input register) and on the other hand the most recent status indication can safely be read, synchronized to the second reference clock of the second domain B, from the intermediate register INT into the output register ORM (as shown with the step ST4 in FIG. 6).

As explained above, the hold signal LOCK has a duration long enough to allow a transfer of data from the intermediate register INT to the output register ORM when the readout pulse STROBE is generated. Since the length of the hold signal LOCK is also based on the length of the read lock pulse RDLCK which itself must have a duration allowing its synchronisation in the clock domain A (plus the setup-hold time in the synchronisation stage SS), a typical length for the hold signal LOCK (also covering at least one pulse of the second reference clock at which the read out strobe STROBE is generated) is a multiple, e.g. twice or three times the first reference clock CLK_A period. For the frequency relationships in FIGS. 5a, 5b, 5c this is enough to allow the transfer of data from the intermediate to the output register, i.e. that the output register ORM reads in the clock domain B an indication which has been clocked into the intermediate register INT with the clock domain A reference.

Thus, the hold signal LOCK causing the holding of a current status indication in the intermediate storage stage and blocking a shifting of a new status indication from the input storage stage acts as a kind of "masking time" long enough for compensating any frequency and/or phase relationships of the two reference clocks CLK_A, CLK_B, as can easily be seen from FIGS. 5a, 5b, 5c. For example, in FIG. 5c it is only important that indeed the readout pulse STROBE occurs within the time duration of the hold signal LOCK, however, it does not matter at all whether it is the second or third pulse within the hold signal duration LOCKL" which is used for reading out the intermediate registers INT. However, the read out strobe STROBE is generated synchronized to the end of the read lock signal RDLCK to avoid that a read out occurs from the intermediate to the output register before the read lock pulse RDLCK is synchronized in the clock domain A and consequently the hold signal LOCK can be generated.

Thus, the following essential steps can be summarized as follows:

1. As long as no hold signal LOCK occurs, the status indications are shifted like in a shift register from the input register INM to the intermediate register INT (steps ST1, ST2, ST3).
2. When the read request RDRQ is generated at some time (possible synchronized to the second reference clock) in step S1, some time later (LS, LS', LS") the hold signal LOCK covering at least one pulse period of the second reference clock is generated. The hold signal LOCK has a duration long enough to allow a transfer of data from the intermediate register INT to the output register ORM when the readout pulse STROBE is generated. Since the length of the hold signal LOCK is also based on the length of the read lock pulse RDLCK which itself must have a duration allowing its synchronisation in the clock domain A (plus the setup-hold time in the synchronisation stage SS), a typical length for the hold signal LOCK (also covering at least one pulse of the second reference clock at which the read out strobe STROBE is generated) is twice the first reference clock CLK_A period.
3. A readout strobe STROBE is generated (S6) within the hold signal duration at the end of the read lock pulse RDLCK and the current status of the intermediate register INT is read to the output register ORM (ST4) synchronized to the second clock CLK_B.
4. During the generation of the lock signal LOCK a current status indication is kept in the intermediate register INT and new status indications can be read into the input register INM, synchronized to the first reference clock.

This procedure works independently of any frequency relationships $f_A>f_B$, $f_A<f_B$; $f_A=f_B$ of the first and second reference clock frequencies $f_A$, $f_B$. That is, in response to the read request signal RDRQ output by the processing means PROC, for example from a microcontroller (MC), eventually the hold signal LOCK is generated. The feature of the invention that the MC always receives the "most recent" status indication is a consequence that after the read access from the output register to the intermediate register the clear pulse CLEAR_PULSE is generated allowing an updating of the input register INM, i.e. of the STATEG.

Therefore, in the present invention the provision of an input register INM, an intermediate register INT (both belonging to the clock domain A) and an output register ORM (belonging to the clock domain B) and their special control with the readout signal STROBE and hold signal LOCK is a relationship responsible for allowing that independently of the phase and frequency relationships no new input status will be lost and the most recent status indication is transferred via the domain boarders.

Furthermore, by the above combination of features the metastability in the output register ORM can be avoided by functional means, i.e. by the appropriate generation of the readout pulse STROBE.

Delayed Shifting from Input to Intermediate Resister

As shown in FIG. 6, (and as can also be seen from FIGS. 5a, 5b, 5c), after the hold signal LOCK stops at LE, LE', LE" the status indication is kept in the input storage stage register INM (STATREG) for at least one more first reference clock period (ending at STE, STE', STE"). That is, the clear pulse CLEAR_PULSE is responsible for controlling the updating of the input register INM. On the one hand, it is the expiration of the hold signal LOCK (LOCK="0") which is controlling the transfer of the input register INM contents to the intermediate register INT. On the other hand, the CLEAR_PULSE is suppressed in situations where an update of the input register INM would alter the input register INM content, although the intermediate register INT has not sampled the old content of the input register INM as yet.

Examples in FIGS. 5a, 5b, 5c

Above it was explained how the relationship between the signals STROBE, LOCK and CLEAR_PULSE is in response to a single occurrence of the read request pulse RDRQ. However, as can be seen from FIGS. 5a, 5b, 5c, a periodic read cycle, i.e. the read request signal RDRQ is output on a period basis, can be used. How often and with what frequency the microcontroller MC (the processing means PROC) reads depends on the actual implementation. Realistic access cycles are in the order of every $10^6$ CLK_A clock cycles and only as an illustrative example FIG. 5a shows a read access every 4-th period, FIG. 5b every 5-th period and FIG. 5c every 18-th period.

As can be seen from FIG. 5a, FIG. 5b and FIG. 5c, no matter what phase the read and update process has, the status indication is captured and is not lost. If asserted before the n-th read access starting with the assertion of RDRQ, it will be visible in the output register ORM (OUTPUT_REG) exactly after this n-th access.

If, however, the status indication is asserted during the n-th read access, it will be visible in the output register ORM (OUTPUT_REG) after the (n+1)-th read access. Therefore, a maximum of n+2 read access cycles (synchronized to the second reference clock CLK_B) are sufficient in order to shift the new status indication from the input register IRM into the output register ORM. That is, two read accesses are necessary because there may be a case where RDRQ and IN_STATUS have such an inappropriate time relationship that the signal CLEAR_PULSE (essentially derived from the read request signal RDRQ) must be suppressed to avoid loosing a status indication. In such a case an indication which occurs in the n-th read cycle will only be visible for the microcontroller MC (the processing means PROC) in the (n+1)th read cycle.

However, the procedure is completely independent of the phase and/or frequency relationships, i.e. the procedure works in the same manner for FIG. 5a: $f_A>f_B$, FIG. 5b: $f_A=f_B$ (equal frequency and fixed phase difference) and FIG. 5c: $f_A<f_B$.

Hereinafter, a special embodiment of circuit elements used for the output register ORM, the synchronization stage SS, the intermediate register INT, the input storage control means DM and the input register INM is explained with reference to FIG. 4.

Logic Gate Implementation for Qualitative Status Indication

FIG. 4 shows a more specific circuit realization with logic gates, multiplexers and D flip flops as a preferred embodiment of the status indication detection apparatus SIDN shown in FIG. 3. As described for FIG. 3, also in FIG. 4 a synchronization is provided on a functional basis and not by synchronization stages and is separately merged with a "clear at read" feature to build up a generic design applicable for arbitrary clock relationships.

More specifically, the output storage stage OSS comprises for said output register ORM an output multiplexer 106 and an output D flip flop 107; OUTPUT_REG. For a positive logic the output terminal Q is fed to the "0" input of the multiplexer 106 and the clock input of the D flip flop 107 receives the second reference clock CLK_B input from the outside. The "1" input of the multiplexer 106 is connected to the intermediate storage stage ISS.

The control pulse generator CG generally comprises a control means CNTRL receiving the externally input read request signal RDRQ and outputting said read lock pulse RDLCK and said readout signal STROBE. When the read out signal STROBE is high then the multiplexer IO6 selects the "1" terminal and when it is low it selects the "0" terminal of the multiplexer IO6 (for a positive logic). Furthermore, the second reference clock CLK_B is also input to the control means CNTRL.

As can be seen from the feedback of the Q-output to the "0" terminal of the multiplexer 106, in a previous second clock reference cycle a status indication IN_STATUS' has been stored in said D flip flop IO7 (for this purpose the read out signal is high to select the "1" terminal), and when the readout signal STROBE is subsequently switched to low, then any status indication IN_STATUS' read into the D flip flop is kept cycling, synchronized to the second reference clock CLK_B through the feedback and the multiplexer IO6. Thus, one can say that in a time period in which the read-out signal STROB is low ("0") the "0" terminal will be selected and any status indication is kept cycling in the D flip flop 107 whilst, due to the selection of the "0" terminal, the transfer of any further current status indication IN_STATUS' from the intermediate storage stage ISS is blocked. That is, when the read out signal STROBE is generated (is high) a new status indication is input into the output register ORM and when it is not generated (low) a status indication is kept (cycling) in the output register ORM.

As can be seen from FIG. 4, the intermediate register INT of the intermediate storage stage ISS also comprises an intermediate multiplexer 104 and an intermediate D flip flop which are connected in the same manner as the output register ORM. The only difference is that the "1" and "0" terminals of the intermediate multiplexer IO4 are reverse to those of the output multiplexer IO6. That is, when the hold signal LOCK is generated (is high) the "1" terminal of the multiplexer IO4 is selected, such that any current status indication stored in the n-bit register 105 will be kept (cycling) with the first reference clock CLK_A which is input into the clock input of the D flip flop.

When the hold signal LOCK is not generated (is low) the lower "0" terminal is selected allowing a transfer of a new status indication from the input storage stage INS. Therefore, one can say that in time periods where the hold signal LOCK is generated, any current status indication is kept cycling in the intermediate register INT whilst the transfer of a new status indication from the input storage stage INS is blocked. When the hold signal LOCK is not generated, a new status indication can be read into the D flip flop IO5, BRIDGEREG.

As can be seen from FIG. 4, the hold signal LOCK is output by a synchronization stage SS which typically comprises at least two serially connected D flip flops IO9, I10. The two D flip flops IO9, I10 are clocked with the first reference clock CLK_A and the first D flip flop receives as input the read lock pulse RDLCK output by the control pulse generator CG.

As already explained with reference to FIGS. 5a, 5b, 5c, the effect of the synchronization stage SS is essentially that the read lock pulse RDLCK having a length RDLCKL, RDLCLKL', RDLCKL" (i.e. a length long enough to allow a synchronization in the first clock domain A, i.e. at least one first reference clock CLK_A cycle plus the necessary setup-hold time in the D-flip flop I09 and long enough such the hold signal LOCK generated based on the read lock signal RDLCK is long enough to allow the transfer of data from the intermediate into the output register, see equation (1)) is synchronized to the first reference clock CLK_A in the clock domain A. The duration of the read lock pulse RDLCK is thus also chosen according to the first reference clock CLK_A period and has a length of at least one second clock signal period because the second clock reference period is the shortest duration which a pulse synchronized to the second reference clock CLK_B can have.

Depending on the phase and/or frequency difference, the hold signal LOCK which is now synchronized to the first reference clock CLK_A may be slightly shorter than the read lock pulse RDLCK. The hold signal LOCK is applied to the intermediate multiplexer IO4.

As also shown in FIG. 4, the input register INM comprises two serially connected input multiplexers IO1, IO2 and an input D flip flop IO3, STATREG. The Q output of the D flip flop IO3 is connected with the "0" terminal of the intermediate multiplexer IO4. Furthermore, the D-input of the D flip flop IO3 is connected with the output of the multiplexer IO2 and the first reference clock CLK_A is input into the clock terminal of the D flip flop IO3.

The output of the first multiplexer IO1 is connected with the "0" terminal of the second multiplexer IO2 whose "1" terminal is connected permanently with a "1" level. The select signal applied to the second multiplexer IO2 is the status indication IN_STATUS. That is, if (for appositive logic) a "1" status indication is received, the multiplexer IO2 will select its "1" terminal and therefore forwards the "1" level of the "1" terminal to the D input of the D flip flop IO3. Otherwise, i.e. when there is not status indication, the output of the first multiplexer IO1 is supplied to the input D flip flop IO3.

The "1" terminal of the first multiplexer IO1 is connected permanently to an "0" level and the "0" terminal of the first multiplexer IO1 receives the signal from the Q-output of the D flip flop IO3.

Therefore, when the CLEAR-PULSE is generated (is high for a positive logic) then the "0" level of the selected "1" terminal is passed to the "0" terminal of the second multiplexer IO2. When the CLEAR_PULSE is not generated (is low for a positive logic), then the output Q of the D flip flop is passed to the "0" terminal of the second multiplexer IO2.

Therefore, one can say that a new status indication IN_STATUS stored in the D flip flop IO3 is kept (cycling with the first reference clock CLK_A) in the input register INM when the CLEAR_PULSE is not generated and when no new status indication IN_STATUS occurs.

When a new status indication IN_STATUS occurs then this new status indication will be clocked into the D flip flop IO3 by selecting the "1" level input to the "1" terminal of the second multiplexer IO" and one first reference clock period later this new status indication is kept (cycling) in the input register INM as long as the CLEAR_PULSE is not generated.

On the other hand, the generation of the clear signal CLEAR_PULSE causes an inputting of the "0" level from the "1" terminal of the first multiplexer IO1 to the "0" terminal of the second multiplexer IO2. Therefore, the first multiplexer IO1 serves to reset status indications in the input register INM and the second multiplexer IO2 serves to set a new status indication in the input register INM.

The clear pulse CLEAR_PULSE is generated by the input update control means DM having the following configuration. The input update control means DM comprises a D flip flop I11 locked with the first reference clock CLK_A and receiving at its D-input the output of the D flip flop I10, i.e.

the hold signal LOCK. The Q-output of the D-flip-flip I11 is input into a first terminal of the first AND gate I12. An inverted version of the hold signal LOCK is input to second terminal of the first AND-gate I12 and thereby implementing a negative edge detection on the hold signal LOCK. The output of the first AND gate I12 is the CP signal which is also shown in FIGS. 5a, 5b, 5c and FIG. 6.

A first input of an XNOR Gate I13 receives the output of the intermediate D flip flop IO5 and a second terminal of the XNOR Gate I13 receives the output of the input D flip flop IO3. An inverted version of the output of the XNOR gate I13 is supplied to a first terminal of a second AND gate I14 and the CP signal is input to a second terminal of this AND gate I14. The output of the second AND gate I14 and the CP signal is input to a second terminal of this AND gate I14. The output of the second AND gate I14 is the clear pulse CLEAR_PULSE which is input to the first multiplexer I01 of the input register INM.

Due to the circuit interconnection of the D flip flop I11 and the first AND gate I12 a pulse CP will be generated as shown in step S4 in FIG. 6 and this pulse CP synchronized to the first reference clock CLK_A occurs exactly at the first reference clock period following the end of the hold signal LOCK.

As also shown in particular in FIG. 6, the generation of the pulse CP in step S4 causes the generation of the CLEAR_PULSE in step S5. CLEAR_PULSE enables the take-in of a current status indication IN_STATUS into the input register STATREG. The actual transfer of a stored indication in the STATREG to the BRIDGEREG is controlled by the hold signal LOCK, i.e. the hold signal LOCK ceases (LOCK="0"), this will select the "0" input of the multiplexer IO4 and thus the transfer of the multiplexer input into the BRIDGREG.

With the generation of the CLEAR_PULSE the new status indication in the D flip flop IO3, STATREG is shifted to the intermediate register INT; BRIDGEREG, as shown with step ST5 in FIG. 6.

Since the generation of the final CLEAR_PULSE implicitly depends on the inputting of a signal from the Q-output of the intermediate n-bit register IO5; BRIDGEREG, one can say that a transfer of any new status indication in the input n-bit register IO3, STATREG to the intermediate storage stage ISS will only take place when a current status indication has been read out from the intermediate storage stage ISS, more particularly from the intermediate n-bit register IO5. This is necessary in order to avoid that a new inputting of new status indication from the input storage stage INS causes an alteration of the content of the intermediate storage stage before the intermediate storage stage content has been successfully read out to the output storage stage.

Having described above the principal functions and interconnections of the gates and flip-flops and multiplexers in FIG. 4, hereinafter an operation of the circuit in FIG. 4 is described (as also shown in FIGS. 5a, 5b, 5c and in FIG. 6).

Operation of the Clock Domain A

During a "regular" operation, i.e. when the clear pulse CLEAR_PULSE and the hold signal LOCK both are not generated (are "0"), the input flip-flop IO3 and the intermediate flip-flop IO5 work like a shift register. That is, the input flip-flop IO3 is set to "1" via the second input multiplexer IO2 as soon as the new status indication IN_STATUS occurs and the intermediate flip-flop IO5 samples the input flip-flop IO3 via the intermediate multiplexer IO4. Thus, the intermediate flip-flop IO5 holds the same content as the input flip-flop IO3 with one first reference clock CLK_A cycle delay.

Once the input flip-flop IO3 is set, it holds its content by feeding back its Q output to its D input via a first and second multiplexer IO1 and IO2. In this manner, a one-pulse status indication on IN_STATUS gets captured in the input register INM and is kept there cycling (unless a new indication IN_STATUS or a CLEAR_PULSE signal occurs).

As explained above in great detail for the configuration in FIG. 3, for a read access the read request signal RDRQ and based thereon the read lock pulse RDLCK is generated and is synchronized to the clock domain A by means of the synchronization stage SS (IO9, I10). The synchronized version of RDLCK, namely the hold signal LOCK, selects the intermediate multiplexer IO4 to feedback the output of the intermediate n-bit register IO5 to its input. As long as the hold signal LOCK is generated, the content of the intermediate n-bit register Io5 will not change. During this period of time it is safe to strobe the content of the intermediate n-bit register IO5 into the output register ORM without the danger of causing metastability in the n-bit register IO7. In this context "safe" means that due to the generation of the hold signal LOCK (covering at least one second reference clock pulse) a current status indication in the intermediate storage stage ISS can be safely read into the output storage stage OSS, because the read out signal STROBE is generated during the duration of the hold signal LOCK.

During this "safe" operation, the input n-bit register is not affected by the locking or holding of the intermediate register INT content. The input stage INS can therefore still capture new status indications (which are kept cycling in the input register INM) until the hold signal LOCK ceases.

In the clock domain A the n-bit register I11 and the first AND gate I12 are needed to perform a negative edge detection on the hold signal LOCK for generating the raw clear pulse CP (for positive logic). A change from high to low on the hold signal LOCK indicates (for positive logic) the end of a read access and the potential start of an update phase for the input n-bit register IO3. The clear pulse CLEAR_PULSE is derived from the raw clear pulse CP using the XNOR gate I13 and the second AND gate I14, substantially in order to suppress the clear pulse CLEAR_PULSE in situations in which an update of the input n-bit register I03 would alter the input n-bit register IO3 although the intermediate n-bit register has not sampled the old content of the input n-bit register IO3 yet.

Operation in the Clock Domain B

As explained above, the clock domain B is the domain to which any new status indication IN-STATUS captured in the input storage stage INS has to be transferred to securely for further processing. The final destination of a status indication captured in the input storage INS is therefore the output register ORM. The n-bit register IO7 of the output register ORM samples the intermediate n-bit register IO5 when the read out signal STROBE is generated. Otherwise the status indication in the output n-bit register IO7 is fed back to the output multiplexer IO6 and therefore does not change.

The control means CNTRL is, as explained above, responsible for properly generating the read lock pulse RDLCK and the read out signal STROBE. As explained above and as can be seen from FIGS. 5a, 5b, 5c, 6, the read lock pulse RDLCK is an extended version of the read request signal RDRQ (the primary read request pulse). The read request pulse RDRQ is therefore extended by the control means CNTRL to such a duration that the read lock pulse RDLCK can safely be sampled by the first n-bit register IO9 of the synchronization stage SS. This duration can vary from one second reference clock CLK_B period (FIG. 5a), if $f_A > f_B$, to a multiplicity of a second reference CLK_B cycles, if $f_A < f_B$ (FIG. 5c).

As also explained above, the read out signal STROBE is a signal which occurs always within the duration of the hold signal LOCK and in particular it is located in the last cycle duration of the read lock pulse RDLCK.

It should be mentioned that for the purpose of the embodiment in FIG. 4 it does not matter how the control means CNTRL is implemented in detail, as long as it performs the function to generate the read lock pulse RDLCK and the read out signal STROBE properly. For example, the control means CNTRL may comprise a simple shift register if all capturing clock domains are of the same frequency or a more complex state machine which is capable of handling access to a variety of differently clocked domains.

Input Storage Stage Including a Counter

Since the time relationship between the occurrence of a status indication IN_STATUS and the occurrence of a read request signal RDRQ is generally not defined, the following may happen.

Assume that a first raw status indication IN_STATUS (i.e. first status bit) has been input and stored in the input n-bit register IO3. As long as no new status indication is input to the input storage stage INS, the presently available status indication is kept (cycling) in the input register INM. As explained above, when the read request signal RDRQ occurs, a safe transfer of this status indication to the intermediate storage stage and then a safe reading out of the intermediate storage stage during the duration of the hold signal LOCK to the output register ORM is performed.

However, this assumes that no new raw status indication is input into the input storage stage INS before the read request signal RDRQ occurs. If on the other hand the read request signal RDRQ does not occur for a long period of time, it may happen that there is another new raw status indication IN_STATUS which is then clocked into the intermediate n-bit register IO3. This would mean that in response to the read request signal RDRQ only the latest, i.e. most recent new status indication, would be transferred to the intermediate stage IS and then to the output stage OSS.

Logic Gate Implementation for Counting Status Indications

FIG. 7 shows another embodiment of a logic implementation of the status indication determining means SIDM avoiding the aforementioned problems. This status indication determining device SIDM is provided for the case when the number of raw status indications between two read accesses shall be counted. In this case, raw status indications are accumulated in the input storage stage INS and the input storage stage INS, the intermediate stage INT and the output storage stage OSS respectively store a status indication comprising n bits. The storage of the n bits and the transfer of the n bits is indicated at the respective connections with a reference numeral "n". The raw status indications in the example of FIG. 7 are 1-bit indications although raw indications consisting of k-bits are also conceivable if the input storage stage INT is accordingly adapted.

As can be seen by a comparison of FIG. 7 and FIG. 4, the output storage stage OSS and the intermediate storage stage ISS in FIG. 7 have the same construction as the corresponding output storage stage OSS and the intermediate storage stage ISS in FIG. 4. The only difference is that the intermediate register INT and the output register ORM are provided for storing and transferring a status indication of n bits as indicated with the reference numeral "n" in FIG. 7. On the other hand, the control pulse generator CG and the synchronization stage SS are identical in FIG. 7 and FIG. 4.

The input storage stage INS also comprises an input register INM and an input update control device DM performing similar functions as in FIG. 4, however, for the purpose of accumulating, storing and transferring a status indication of n bits. Thus, the input register INM comprises an n-bit register I17 having its Q output connected to the "0" input of the multiplexer I04 of the intermediate register INT. As in FIG. 4 the first clock CLK_A is supplied to the clock input of the n-bit register I17.

The input update control device comprises a n-bit register I11 and an AND gate I12 which have a similar circuit connection as the corresponding n-bit register I11 and the AND gate I12 in FIG. 4. Thus, the D input of the Flip-Flop I11 receives the Q output of the second Flip-Flop I10 of the synchronization stage SS. The first reference clock CLK_A is supplied to the clock input of the n-bit register I11. Contrary to FIG. 4, the Q output of the n-bit register I11 is inverted and supplied to the AND gate I12. The hold signal LOCK supplied to the multiplexer I04 of the intermediate register INT is supplied by the Q output of the n-bit register I11. The second input of the AND gate I12 is connected to the output Q of the n-bit register I10 of the synchronization stage SS.

The input input storage INS further comprises a four input/single output multiplexer I15 whose output is connected to the D input of the n-bit register I17 of the input register INM. A first input of the multiplexer I15 is connected directly to the output of the n-bit register I17. A second input is connected to the output of an adder (incrementer) I18 which adds a "1" to the current content of register STATCNT. A third input receives a logical "0" and a fourth input receives an integer "1". For switching one of the four inputs to the output of the multiplexer, the multiplexer receives as switching signals the status indication pulse IN_STATUS and the output CLEAR_PULSE of the AND gate I12. As indicated in the I15 block, the first input is selected with "00", the second input is selected with "10", the third input is selected with "01" and the fourth input is selected with "11".

The selection is done bit-wise. This means that whenever a new raw status indication bit arrives, this bit together with the corresponding logical output level of the AND gate I12 will provide the respective switching signals to the multiplexer I15. As can be understood from the circuit connections in FIG. 7, as long as no new status indication bit arrives (IN_STATUS=0) and as long as no CLEAR_PULSE is output by the AND gate I12 (CLEAR_PULSE=0), the content of register STATCNT remains unchanged because the output is fed back to the input via multiplexer I15. If a new status indication bit arrives (IN-STATUS=1), the second input will be selected which causes an increment by 1 of register STATCNT because the adder I16 adds "1" to the output Q of the register STATCNT. When the CLEAR_PULSE=1 is output by the AND gate I12, then an integer "1" is inserted when the status indication bit equals 1 and a 0 is inserted if the status indication bit is 0.

The hold signal LOCK output by the n-bit register I11 is, similar as in FIG. 5, output at a time and with a length long enough to allow the reading out of the status indication bits stored in the intermediate register INT in response to the read request signal. When the hold signal LOCK is not generated (=0), then n status indication bits stored in the n-bit register I17 can be transferred to the intermediate register Flip-Flop I05. Since the configuration is adapted for status indications of n-bits, the n-bit register acts as a counter and is therefore denoted with "STATCNT" in FIG. 7. As may be understood from FIG. 7, this counter STATCNT is capable to count the number of incoming status indications of n-bits between two read accesses, i.e. between two occurrences of the read request signal RDRQ.

Although the embodiment in FIG. 7 shows a status indication determining means SIDM with registers and connections adapted to the parallel transmission of n-bit status indications, the status indications determining device can also be embodied with serial transmission of status indications between the registers.

Figure 8:
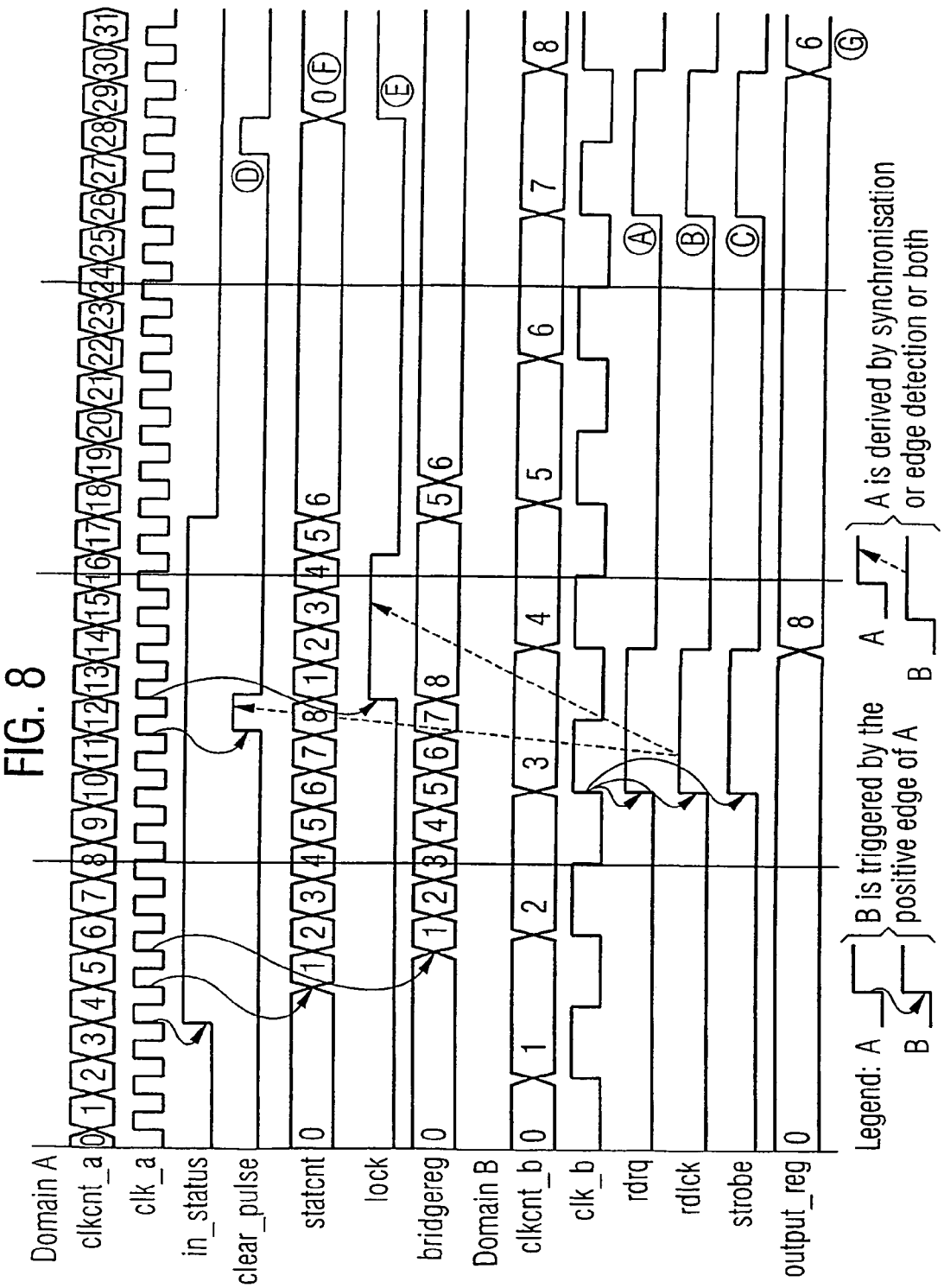
FIG. 8 shows a sequential flow chart of generating signals and transferring status indications for the circuits in FIG. 7.

FIG. 8 shows, similarly as FIG. 5, a time flowchart of the respective signals in FIG. 7. This example in FIG. 8 shows that the circuit in FIG. 7 receives 14 status indication bits of which a first part falls into the first read cycle. It is apparent that first a counter value of 8 and then a counter value is 6 is read out. The sum of 8 and 6 is 14 and therefore no status indication bit (pulse) has been missed out. Thus, the embodiment in FIG. 7 can accumulate n raw status indication bits, transfer the number of read indications to the intermediate register from which the n-bit status indication is read out to the output register.

A more detailed description of the signal flow in FIG. 8 is described below. Firstly, it should be remembered that the circuit in FIG. 4 is capable of reading a single raw status indication pulse (bit), to transfer the read indication from the clock domain A to the clock domain B and to update the input register INM during a read out cycle to the output OUTPUT_REG. Once an indication IN_STATUS has been read into the input register STATREG, newly arriving status indications do not cause a change in the STATREG. Reading out the output register OUTPUT_REG twice allows with certainty to detect the occurrence of a status indication (existence check). However, the circuit in FIG. 4 is not capable to detect how many indication pulses (bits) are occurring in the IN_STATUS.

Assume that in FIG. 4 the status indication pulse IN_STATUS indicates that an integrity check regarding an expected message block has failed. Assume further that in the transmission system in which the circuit in FIG. 4 is incorporated it is of interest to calculate the block error rate (BER). Thus, it is important in such a case to calculate the indications per unit time. The microcontroller could in this case desire to read out the input register STATREG in predetermined intervals to allow it to check how many indications have been accumulated since the last read out. The "update at read" functionality in the circuit in FIG. 4 must therefore be generalized to a "reset to 0/1 at read" functionality. Therefore, the simple "latching" of indications in the input register STATREG in FIG. 4 is replaced by a counting procedure with respect to the input counter STATCNT in FIG. 7.

The embodiment in FIG. 7 therefore counts the number of indication pulses between two read accesses (between two successive occurrences of the read request signal RDRQ). These indication pulses (bits) are counted in the input counter STATCNT. During the read out of a counter value from the output register OUTPUT_REG, STATREG is, dependent on IN_STATUS and CLEAR_PULSE, reset (to 0) or set (to 1).

To understand the functional behaviour of the circuit in FIG. 7, as shown in FIG. 8, an indication clkcnt_a of clock cycles may be defined. This indication clkcnt_a corresponds to the number of clock cycles in the domain A and facilitates the understanding of the time relationship in FIG. 8.

In FIG. 8, the signal clk_a is the clock which is used for triggering all Flip-Flops in the clock domain A. Whilst negative triggered Flip-Flops can be used in FIG. 7 positive triggered Flip-flops are used. As in FIG. 5, the signal in-status is the status indication pulse (bit) from outside. This is the primary information carrier of course, the occurrence of the status indication pulse with respect to the clock pulse clk_a is arbitrary, i.e. the status indication pulse does not necessarily have to occur at the positive edge of the clock signal clk_a, i.e. it does not necessarily have to be synchronized to clk_a. Only for facilitating the understanding of this embodiment the status indication is shown to be synchronized to clk_a. The illustration in FIG. 8 shows a continuous pulse sequence of 14 status indication pulses.

Similarly as in FIG. 5, the signal CLEAR_PULSE is used for resetting the input register counter STATCNT. If CLEAR_PULSE coincides with in_status, STATCNT is set to 1 to count this coinciding indication. If CLEAR_PULSE does not coincide with in_status, the value of input register counter STATCNT is actually deleted (STATCNT→0). The CLEAR_PULSE is generated via a positive edge detection on the synchronized version of RDLCK (which is done through I09–I12).

The input register counter STATCNT stores the number of accumulated indication pulses. In a circuit implementation the STATCNT is the register of a counter constituted with the adder I16 via the multiplexer I15.

The hold signal LOCK is the synchronized version of RDLCK. It serves for holding or allowing the taking in of status indications from the input storage stage INS. Thus, as in FIG. 4, the hold signal LOCK serves for "stabilizing" the intermediate register BRIDGEREG.

The output register OUTPUT_REG stores a copy of the contents of the input register counter STATCNT synchronized to the clock domain B. Although a read access is superimposed by an indication pulse sequence, OUTPUT_REG will correctly indicate 8+6=14 received indication pulses. The other signals and circuits are the same as in FIG. 4, as explained above.

For illustrating the functional behaviour and the dependencies in FIG. 8, four different cases can be distinguished:
1) there is neither a newly arriving status indication nor a read access:
2) there is a read access, however, there is no new indication pulse;
3) there is a new indication pulse, but no read request;
4) there is a read access as well as a new indication pulse.

In the first case, e.g. for $19 \leq clkcnt\_a \leq 27$, there is no action. STATCNT, BRIDGEGREG and OUTPUT_REG do not change their value. They perform a storage operation. All other remaining internal signals are logically 0.

In the second case there is a read access, however, no new status indication pulse occurs. This occurs in the clock cycles $26 \leq CLKCNT\_A \leq 31$.

The read request pulse RDRQ causes the control pulse generator CG to generate a pulse RDLCK which has at least a length of one CLK_A period plus the setup-hold-window-width of the Flip-Flop I09 (events A, B). Preferably, the RDLCK is implemented such that it is two CLK_A periods long. Through the Flip-Flop I09 and I10 RDLCK is synchronized to the clock CLK_A. The synchronization stage SS (I09/I10) can in the general case be longer than two Flip-Flops. Two Flip-Flops are the minimum. With respect to the STROBE signal (event C), this signal has already been explained above in great detail with reference to FIG. 4 and no changes are here in FIGS. 7 and 8. The output of the Flip-Flop I10 is the synchronized version of RDLCK, i.e. synchronized to the clock signal in the clock domain A. As shown in FIG. 7, this signal is denoted with RDLCK' and is at least one CLK_A period long, in the example four CLK_A periods according to the period of CLK_B. The further Flip-Flop I11 delays RDLCK' by 1 clock period and supplies LOCK=RDLK" (event E) to the input register INT and to the AND gate I12. The hold signal LOCK must be delayed by one clock cycle with respect to the RDLCK'/CLEAR_PULSE to allow that in the fourth case the BRIDGEREG can still take in the contents of STATCNT before STATCNT is reset in the time period 12≦CLKCNT_a≦13. With the hold signal LOCK=1, the intermediate register BRIDGEREG feeds back the contents to the multiplexer I04 and this prevents functionally a signal change at the input of OUTPUT_REG. RDLCLK" serves in connection with I12 to detect a positive edge of RDLCK'. If a positive edge occurs in RDLCK', the signal CLEAR_PULSE is set (event D). If no status indication IN_STATUS coincides, the multiplexer I15 selects the input "01"=0 as next content of the STATCNT (event F). In the clock cycle 8 of the clock domain B the value of the intermediate register BRIDGEREG is read to the output register OUTPUT_REG through the multiplexer I06 (event G).

The third case is shown for the clock cycles 4≦CLKCNT_a≦9. With each occurrence of a new indication pulse, the input "10" is selected and the contents of STATCNT is through the intermediary of the adder (incrementer) I16 incremented. The CLEAR_PULSE is in the third case always 0, because it is not set due to the absence of read pulses RDLCK. In the third case, the BRIDGEREG takes in, with each cycle of the first clock CLK_A, the value from STATCNT, because the hold signal LOCK is not set.

For the sequence of signals from RDRQ until CLEAR-PULSE all the considerations for the second case apply. The only difference to the second (and third) case is that the input "11"=1 is selected at the multiplexer I15 and that STATCNT is therefore set to 1 in the clock cycle 13. Logically, this corresponds to a reset to 0 with an immediate incrementing procedure.

Summarizing, the embodiment in FIG. 7 and FIG. 8 allows to accumulate a number of status indications in the input storage stage INS and when a read request signal occurs from the clock domain B, the number of status indications then prevailing are transferred to the intermediate storage stage INT and are then transferred to the output storage stage OSS. This is performed during the generation of the hold signal LOCK. In the duration of the hold signal LOCK, a number of status indication pulses can be accumulated in the input storage stage INS and are then transferred to the intermediate stage INT when the hold signal LOCK ceases.

Thus, also the number of status indications can be determined (accumulated) and can be safely transferred to the output storage stage OSS without losing any status indication.

INDUSTRIAL APPLICABILITY

As explained above, in accordance with the present invention an intermediate storage stage ISS is provided between the input stage INS and the output stage OSS. Status indications are shifted into the intermediate storage stage ISS and during the generation of a hold signal holding the content of the intermediate storage stage ISS and blocking a transfer of a new status indication from the input storage stage INS, the content of the intermediate storage stage ISS is transferred to the output storage stage OSS without causing metastability in the output register ORM.

The design is operable for any frequency and/or phase relationship between the first reference clock and the second reference clock and still no new status indication will be lost. Furthermore, it is always guaranteed that the content of the output register is the most recent status indication and is properly transmitted over the clock domain border.

Such a status indication detection apparatus and status indication detection method are particularly useful for monitoring SONET/SDH applications as hardware devices. Furthermore, the input, intermediate and output stage may be realized by VLSI structures in ASICS.

Furthermore, it should be noted that the invention can comprise various other modifications and variations within the scope of the invention as described. In particular, the invention may comprise further embodiments consisting of features and/or steps which have been separately described and/or claimed in the description and/or in the following claims.

In the claims, reference numerals only serve clarification purposes.

The invention claimed is:
1. A method for detecting status indications, comprising the steps of:
   a1) raw status indications are read into an input storage stage of a first reference clock domain such that the read status indications are available in said input storage stage synchronized to a first reference clock of said first reference clock domain;
   a2) said read status indications are input into an output storage stage of a second reference clock domain, such that the status indications are available in said output storage stage synchronized to a second reference clock of said second reference clock domain, said second reference clock of said second reference clock domain having a different phase and/or frequency to said first reference clock;
   b) said status indications in said input storage stage are shifted to an intermediate storage stage of said first reference clock domain synchronized to said first reference clock; and
   c) in response to a read request signal being input into said output storage stage:
      c1) a hold signal is applied to said intermediate storage stage for holding a current status indication in said intermediate storage stage and blocking a shifting of a new status indication from said input to said intermediate storage stage; and
      c2) during said hold signal a read out signal is applied to said output storage stage for reading the current status indication in said intermediate storage stage into said output storage stage synchronized to said second reference clock.
2. A method according to claim 1, wherein
during said hold signal a new raw status indication is read into and kept stored in the input storage stage; and
after the hold signal ceases the status indication in the input storage stage is shifted to said intermediate storage stage synchronized to said first reference clock.
3. A method according to claim 1, wherein
in said step c), said read request signal is input into the output storage stage synchronized with said second reference clock.
4. A method according to claim 3, wherein
said read request signal synchronized to said second reference clock has a duration of one second reference clock period.

5. A method according to claim 1, wherein
in said step c1), said hold signal is applied to said intermediate storage stage synchronized with said first reference clock.

6. A method according to claim 1, wherein
after the hold signal ceases, the status indication is kept in the input storage stage at least for one more first reference clock period.

7. A method according to claim 1, wherein
in said step c1) in response to said read request signal, a read lock pulse is generated synchronized to said second reference clock and is supplied from said second reference clock domain to said first reference clock domain, said read lock pulse having a pulse length being the sum of a time duration needed to allow a safe synchronisation of said read lock pulse in said first reference clock domain with said first reference clock and a time duration to read said status indication from said intermediate storage stage into the output storage stage.

8. A method according to claim, characterized in that wherein
in said step c1), in a synchronisation stage of said intermediate storage stage said read lock pulse (RDLCK) is synchronized to said first reference clock and said hold signal having a pulse length of at least the duration of the synchronized read lock pulse is derived from said synchronized read lock pulse.

9. A method according to claim 8, wherein
said hold signal is derived in such a manner that it has a duration of at least one and preferably two periods of said first reference clock and covering at least one clock pulse of the second reference clock.

10. A method according to claim 7, wherein
in said step c2), said read out signal is synchronized to the end of the read lock pulse.

11. A method according to claim 1, wherein
in an input update control means of said input storage stage, a clear pulse for deleting status indications from the input storage stage is generated, said clear pulse being generated after the ceasing of said hold signal.

12. A method according to claim 1, wherein
the status indications are generated synchronized to said first reference clock period.

13. A method according to claim 1, wherein
said read status indications comprise one bit in said input, intermediate and output storage stage.

14. A method according to claim 1, wherein
said read status indications comprise n-bits in said input, intermediate and output storage stage.

15. A status indication detection apparatus for detecting raw status indications, comprising:
a1) an input storage stage of a first reference clock domain for reading said raw status indications such that the read status indications are available in said input storage stage synchronized to a first reference clock of said first reference clock domain; and
a2) an output storage stage of a second reference clock domain into which said read status indications are input such that the status indications are available in said output storage stage synchronized to a second reference clock of said second reference clock domain, said second reference clock of said second reference clock domain having a different phase and/or frequency to said first reference clock;
b) an intermediate storage stage of said first reference clock domain is provided between the input storage stage and the output storage stage, wherein said status indications in said input storage stage are shifted to an intermediate register of said intermediate storage stage synchronized to said first reference clock;
c1) wherein said output storage stage further comprises a control pulse generator for generating a read out signal to be applied to an output register (ORM) of said output storage stage for reading the current status indication in the intermediate storage stage into said output register synchronized to said second reference clock in response to a read request signal being input into said output storage stage; and
c2) said intermediate storage stage further comprises a synchronization stage for generating a hold signal to be applied to an intermediate register of said intermediate storage stage for holding a current status indication in said intermediate register and for blocking a shifting of a new indication from said input to said intermediate storage stage.

16. An apparatus according to claim 15, wherein
said input storage stage is adapted to read into and keep stored new raw status indications in the input storage stage during the generation of said hold signal; and
when the synchronization stage ceases the generation of the hold signal, a status indication kept stored in an input register of said input storage stage is shifted to the intermediate register of said intermediate storage stage synchronized to said reference clock; and
the control pulse generator applies said read out signal to said output register for reading in a status indication from the intermediate storage stage during the hold signal duration synchronized to said second reference clock.

17. An apparatus according to claim 15, wherein
an input update control means is provided for deleting stored status indications from the input storage stage.

18. An apparatus according to claim 17, wherein
the input update control means controls the input register with a clear pulse in such a manner that the status indication is kept in the input register at least for one more first reference clock period.

19. An apparatus according to claim 17, further comprising
an input update control means of said input storage stage for generating a clear pulse for deleting status indications from the input storage stage, said clear pulse being generated after the ceasing of said hold signal.

20. An apparatus according to claim 17 wherein
said input update control means comprises a n-D flip-flop, two AND gates and an XNOR gate.

21. An apparatus according to claim 15, wherein
said read request signal is input into the output storage stage control pulse generator synchronized with said second reference clock.

22. An apparatus according to claim 21, wherein said read request signal is synchronized to said second reference clock and has a duration of one second reference clock period.

23. An apparatus according to claim 15, wherein
the synchronization stage applies to the intermediate register the hold signal synchronized with said first reference clock.

24. An apparatus according to claim 15, wherein
in response to said read request signal, said control pulse generator generates a read lock pulse synchronized to said second reference clock and supplies it from said second reference clock domain to said first reference clock domain, said read lock pulse having a pulse length being the sum of a time duration needed to allow a safe synchronisation of said read lock pulse in said first reference clock domain with said first reference clock and a time duration to read said status indication from said intermediate storage stage into the output storage stage.

25. An apparatus according to claim 24, wherein
said synchronisation stage of said intermediate storage stage synchronizes said read lock pulse to said first reference clock and derives said hold signal with a pulse length of at least the duration of the synchronized read lock pulse from said synchronized read lock pulse.

26. An apparatus according to claim 25, wherein
said synchronisation stage derives said hold signal in such a manner that it has a duration of at least one and preferably two periods of said first reference clock and covering at least one clock pulse of the second reference clock.

27. An apparatus according to claim 24, wherein
said control pulse generator generates said read out signal synchronized to the end of the read lock pulse.

28. An apparatus according to claim 15, wherein
the status indications are generated synchronized to said first reference clock.

29. An apparatus according to claim 15, wherein
said control pulse generator comprises a control means receiving said read request signal and outputting said read lock pulse and said read out signal.

* * * * *